United States Patent
Otsuka et al.

(10) Patent No.: US 6,697,823 B2
(45) Date of Patent: Feb. 24, 2004

(54) COMPUTER SYSTEM HAVING BACKUP FUNCTION WITH SPECIFIED STORAGE PERIOD OF BACKUP DATA

(75) Inventors: Satoshi Otsuka, Kanagawa (JP); Kazuyuki Marukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/313,385

(22) Filed: Dec. 6, 2002

(65) Prior Publication Data

US 2003/0084072 A1 May 1, 2003

Related U.S. Application Data

(62) Division of application No. 09/318,246, filed on May 25, 1999, now Pat. No. 6,564,235.

(30) Foreign Application Priority Data

Jun. 4, 1998 (JP) .......................................... P10-156219

(51) Int. Cl.⁷ .............................................. G06F 17/30
(52) U.S. Cl. ...................................... 707/204; 711/162
(58) Field of Search ................................ 707/200–204, 707/10; 711/154, 161, 162

(56) References Cited

U.S. PATENT DOCUMENTS

| | | | |
|---|---|---|---|
| 4,558,176 A | 12/1985 | Arnold et al. | 178/22.08 |
| 4,975,898 A | 12/1990 | Yoshida | 369/100 |
| 5,107,419 A * | 4/1992 | MacPhail | 707/9 |
| 5,182,770 A | 1/1993 | Medveczky et al. | 380/4 |
| 5,295,126 A | 3/1994 | Okano et al. | 369/47 |
| 5,319,627 A | 6/1994 | Shinno et al. | 369/54 |
| 5,363,352 A | 11/1994 | Tobita et al. | 369/13 |
| 5,436,770 A | 7/1995 | Muto et al. | 360/51 |
| 5,461,220 A | 10/1995 | Ogino | 235/454 |
| 5,541,903 A | 7/1996 | Funahashi et al. | 369/54 |
| 5,592,452 A | 1/1997 | Yoshimoto et al. | 369/58 |
| 5,644,766 A | 7/1997 | Coy et al. | 707/204 |
| 5,673,382 A * | 9/1997 | Cannon et al. | 714/6 |
| 5,687,397 A | 11/1997 | Ohmori | 395/893 |
| 5,761,301 A | 6/1998 | Oshima et al. | 380/4 |
| 5,799,147 A | 8/1998 | Shannon | 714/6 |
| 5,805,551 A | 9/1998 | Oshima et al. | 369/59 |
| 5,829,046 A | 10/1998 | Tzelnic et al. | 711/162 |
| 5,852,713 A | 12/1998 | Shannon | 714/6 |
| 6,026,414 A | 2/2000 | Anglin | 707/204 |
| 6,189,014 B1 | 2/2001 | Nakashima et al. | 707/200 |
| 6,260,069 B1 | 7/2001 | Anglin | 709/209 |
| 6,282,610 B1 * | 8/2001 | Bergsten | 711/114 |

FOREIGN PATENT DOCUMENTS

| | | |
|---|---|---|
| JP | 63-20769 | 1/1988 |
| JP | 63-261578 | 10/1988 |
| JP | 64-14776 | 1/1989 |
| JP | 3-256225 | 11/1991 |
| JP | 6-314174 | 11/1994 |
| JP | 6-332762 | 12/1994 |
| JP | 7-57263 | 3/1995 |
| JP | 7-64841 | 3/1995 |
| WO | WO 97/14118 | 4/1997 |

* cited by examiner

Primary Examiner—Maria N. Von Buhr
(74) Attorney, Agent, or Firm—Bell Boyd & Lloyd LLC

(57) ABSTRACT

A computer unit with excellent backup function is realized. A backup operation system is set, and based on the setting, a data file under editing or the like is saved in a backup section. The backup operation system is distinguished through existence of execution of a backup operation, execution timing of the backup operation, an object to be backed up, a backup destination, and the like. This prevents data loss in the case where a computer unit is hanged, or in the case where trouble of the computer unit, crash of a terminal side data storage section, or the like occurs.

3 Claims, 21 Drawing Sheets

FIG. 9

| LEVEL | CONTENT OF BACKUP OPERATION | BACKUP CAPACITY |
|---|---|---|
| LV1 | NO BACKUP OPERATION | NO |
| LV2 | PREPARED/EDITED DATA ARE PERIODICALLY AND AUTOMATICALLY SAVED IN HDD | IT IS POSSIBLE TO PREVENT DISAPPEARANCE OF DATA ON THE WAY OF PREPARATION/ EDITING AT HANG-UP OF PUBLIC TERMINAL |
| LV3 | IN ADDITION TO THE OPERATION OF LEVEL LV2, DATA PRIOR TO UPDATE (DATA AT CALLING OF FILE) ARE ALSO AUTOMATICALLY SAVED IN HDD | IN ADDITION TO THE BACKUP CAPACITY OF LEVEL LV2, IT IS ALSO POSSIBLE TO DEAL WITH MISTAKE AT UPDATE SAVING |
| LV4 | ALL OF KEY INPUT ARE SAVED IN HDD AND SERVER | IT IS POSSIBLE TO PREVENT DISAPPEARANCE OF DATA AT ALL STAGES EVEN AT HANG-UP OF PUBLIC TERMINAL OR CRASH OF HDD |
| LV5 | ALL OF KEY INPUT ARE SAVED IN HDD AND SERVER, AND FINAL DATA ARE SAVED IN THE SERVER | IN ADDITION TO THE BACKUP CAPACITY OF LEVEL LV4, IT IS POSSIBLE TO CALL THE FINAL FILE FROM ARBITRARY TERMINAL |

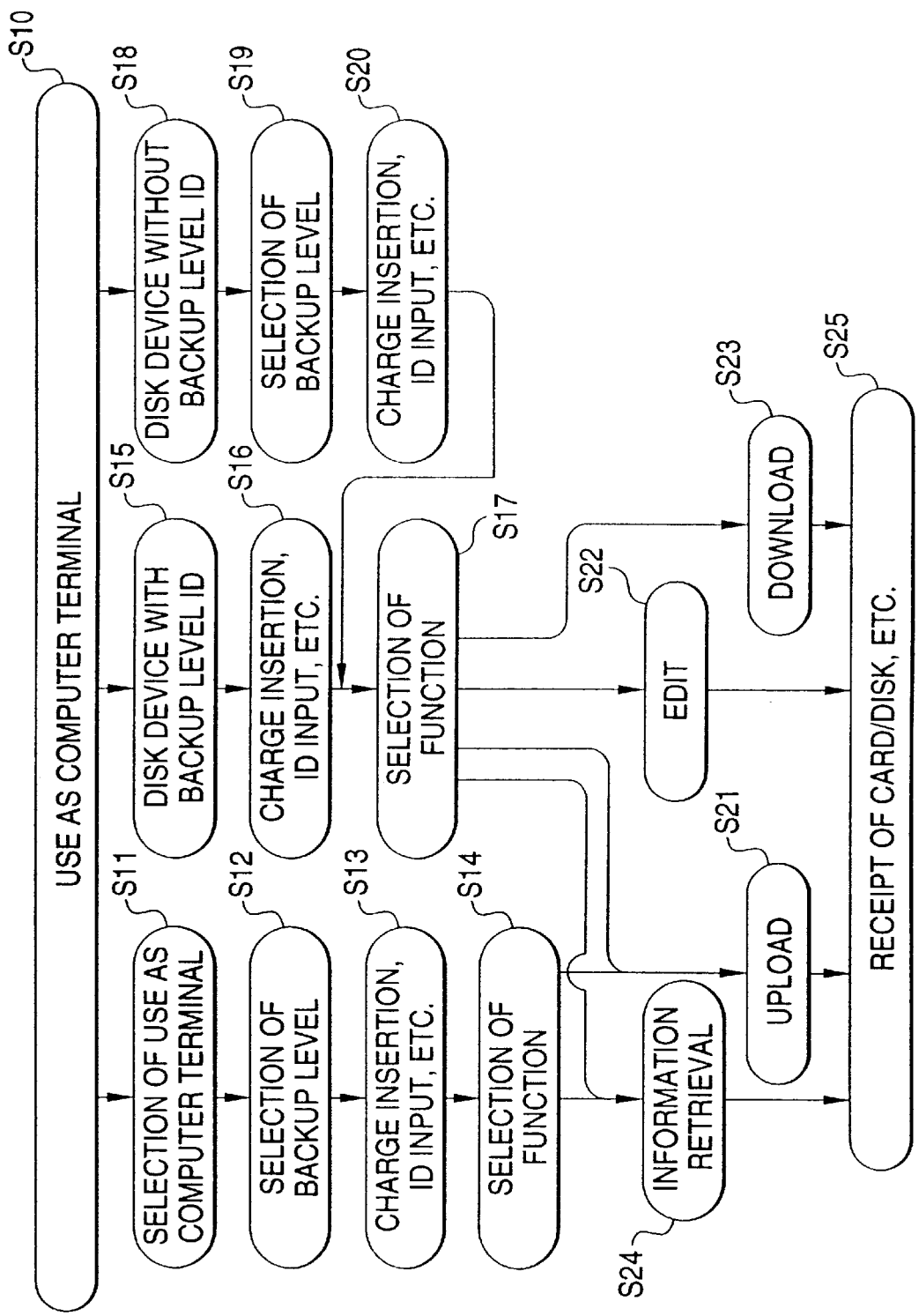

FIG. 14A

PLEASE SELECT BACKUP
LEVEL
① NO BACKUP
② PERIODICAL AUTOMATIC
   SAVING
③ PERIODICALLY+PRIOR
   TO CHANGE FILE IS SAVED
④ ALL OF KEY INPUT ARE
   SAVED IN SERVER AND HDD
⑤ ALL OF KEY INPUT AND
   FINAL FILE ARE SAVED
   IN SERVER AND HDD

FIG. 14B

UNTIL WHEN DO YOU WANT
BACKUP DATA TO BE KEPT
IN SERVER?

UNTIL __ YEAR __ MONTH __ DAY

△ ▽

| 1 | 2 | 3 |
| 4 | 5 | 6 |
| 7 | 8 | 9 |
| 0 |   |   |

DETERMI-NATION    CANCEL

FIG. 14C

PLEASE SELECT BACKUP
LEVEL
① NO BACKUP
② PERIODICAL AUTOMATIC
   SAVING
③ **PERIODICALLY+PRIOR
   TO CHANGE FILE IS SAVED**
④ ALL OF KEY INPUT ARE
   SAVED IN SERVER AND HDD
⑤ ALL OF KEY INPUT AND
   FINAL FILE ARE SAVED
   IN SERVER AND HDD

FIG. 20 (a)

[DOWNLOAD MENU]

PLEASE SELECT ONE WHICH YOU WANT TO DOWNLOAD.

① NEWSPAPER
② MAGAZINE
③ VIDEO SOFTWARE
④ MUSIC SOFTWARE
⑤ APPLICATION SOFTWARE

| FORMER PAGE | NEXT PAGE | CANCEL |

↓ ① SELECTION

FIG. 20 (b)

[DOWNLOAD MENU]

PLEASE SELECT NEWSPAPER WHICH YOU WANT TO DOWNLOAD.

① MAIASA NEWSPAPER
② YOMIKAI NEWSPAPER
③ TOUNAN NEWSPAPER
④ SPORTS KANTO
⑤ NICCHU SPORTS

| FORMER PAGE | NEXT PAGE | CANCEL |

↓ ③ SELECTION

TONAN NEWSPAPER IS SELECTED

COMPUTER SYSTEM HAVING BACKUP FUNCTION WITH SPECIFIED STORAGE PERIOD OF BACKUP DATA

CROSS REFERENCE TO RELATED APPLICATIONS

This patent application is a Divisional Application of U.S. Application Ser. No. 09/318,246, filed on May 25, 1999, now issued as U.S. Pat. No. 6,564,235.

BACKGROUND OF THE INVENTION

1. Field of the Invention

The present invention relates to a backup operation of a data file and a computer unit.

2. Description of the Related Art

Although personal computers have been normally used individually or as a network of the personal computers, in these cases, each personal computer is owned by an individual or an organization such as a company, so that people capable of using the personal computers are limited to a certain degree.

In order to conduct various kinds of information processing, information gathering, and so on, it is necessary to arrange a system such that an individual, a company or the like purchases/rents a personal computer or connects the computer to a network. Particularly, in the case of personal use in a home or the like, the personal computer is not one which can be easily introduced. Thus, it can not be said that the advantage of use of the computer is enjoyed by the majority of people.

Although it appears that with the development of a communication network, electronic information supply to many unspecified people comes into wide use from now on, it has been desired to enable as many people as possible to use the service and the like.

As patent applications in view of these circumstances, there is U.S. patent application Ser. No. 174,290 filed Oct. 16, 1998 and assigned to the same assignee as the present application, which is hereby incorporated by reference. This application relates to a computer system including computer terminals which unspecified many users can arbitrarily use.

In this prior application, computer terminals are disposed in stations and stores like, for example, public telephones, so that many users can perform editing, downloading, uploading, and the like.

In the case where computer terminals are disposed like public telephones so that the public can use them, as a practical problem, it is necessary to design such that measures can be taken at the time of hang-up (freeze) or the like in which the terminal comes not to receive any input.

For example, in the case where hang-up occurs when a user is using a computer terminal to perform operations of file preparation or update, it is quite undesirable that file data under the operations are lost. Especially in the case where a fee is charged for the use of the terminal, the disappearance of the data under the operations gives serious trouble and a loss to the user.

Thus, even in the case where hang-up occurs so that the terminal must be restarted (reset), it is required that data backup is carried out so that the data under the operations are not lost.

SUMMARY OF THE INVENTION

In view of the foregoing circumstances, in such a computer system that many unspecified people arbitrarily use and information processing using computers becomes possible, an object of the invention is to enable such backup operation that data loss can be made minimum even in the case where a computer terminal under use is hanged. Another object of the invention is to enable such high backup operation that data can be held even in the case where for example, a backup data storage section (for example, a hard disk drive) in a computer terminal is crashed.

In order to achieve the above objects, according to an embodiment of the invention, a computer system comprises a server and a computer terminal, the server and the computer terminal being connected to be capable of communicating with each other, wherein the computer terminal comprises data processing means for processing a data file; communication means for communicating with the server; and control means for executing an external backup operation to cause the communication means to transmit the data file processed by the data processing means as backup data to the server, and wherein the server comprises receiving means for receiving the data file as the backup data transmitted from the communication means; and storage means for storing the data file received by the receiving means.

Also, in another embodiment of the invention, a computer system comprises a computer unit and a removable recording medium removably mounted to the computer unit, wherein the removable recording medium comprises a record medium main body; and an information recording area provided in the recording medium main body, wherein backup identification information indicating one of a plurality of backup systems is recorded in the information recording area; and wherein the computer unit comprises data processing means for processing a data file; detection means for detecting the backup identification information from the removable recording medium; and control means for backing up the data file processed by the data processing means with backup system based on a detection result of the detection means.

In a further embodiment of the invention, a computer terminal connected with a server to be capable of communicating comprises data processing means for processing a data file; communication means for communicating with the server; and control means for executing an external backup operation to cause the communication means to transmit the data file processed by the data processing means as backup data to the server.

In a still further embodiment of the invention, a computer unit comprises detection means for detecting, from a removable recording medium in which backup identification information indicating one of a plurality of backup systems is recorded, the backup identification information; data processing means for processing a data file; and control means for backing up the data file processed by the data processing means with the backup system based on a detection result of the detection means.

In an even further embodiment of the invention, a recording medium removably loaded to a computer unit comprises recording medium main body; and a backup identification information recording area formed on the recording medium main body; wherein backup identification information indicating one of a plurality of backup systems of the computer unit is recorded in the recording area.

BRIEF DESCRIPTION OF THE DRAWINGS

FIG. 9 is an explanatory view of various backup systems of an embodiment.

FIG. 11 is an explanatory view of a use procedure of a user to a public terminal of an embodiment.

FIGS. 14A to 14C are explanatory views of examples of a backup level selection screen in a public terminal of an embodiment.

FIG. 20 is explanatory view of example of download object selection screens of a public terminal of an embodiment.

DETAILED DESCRIPTION OF THE PREFERRED EMBODIMENTS

Figure 1:
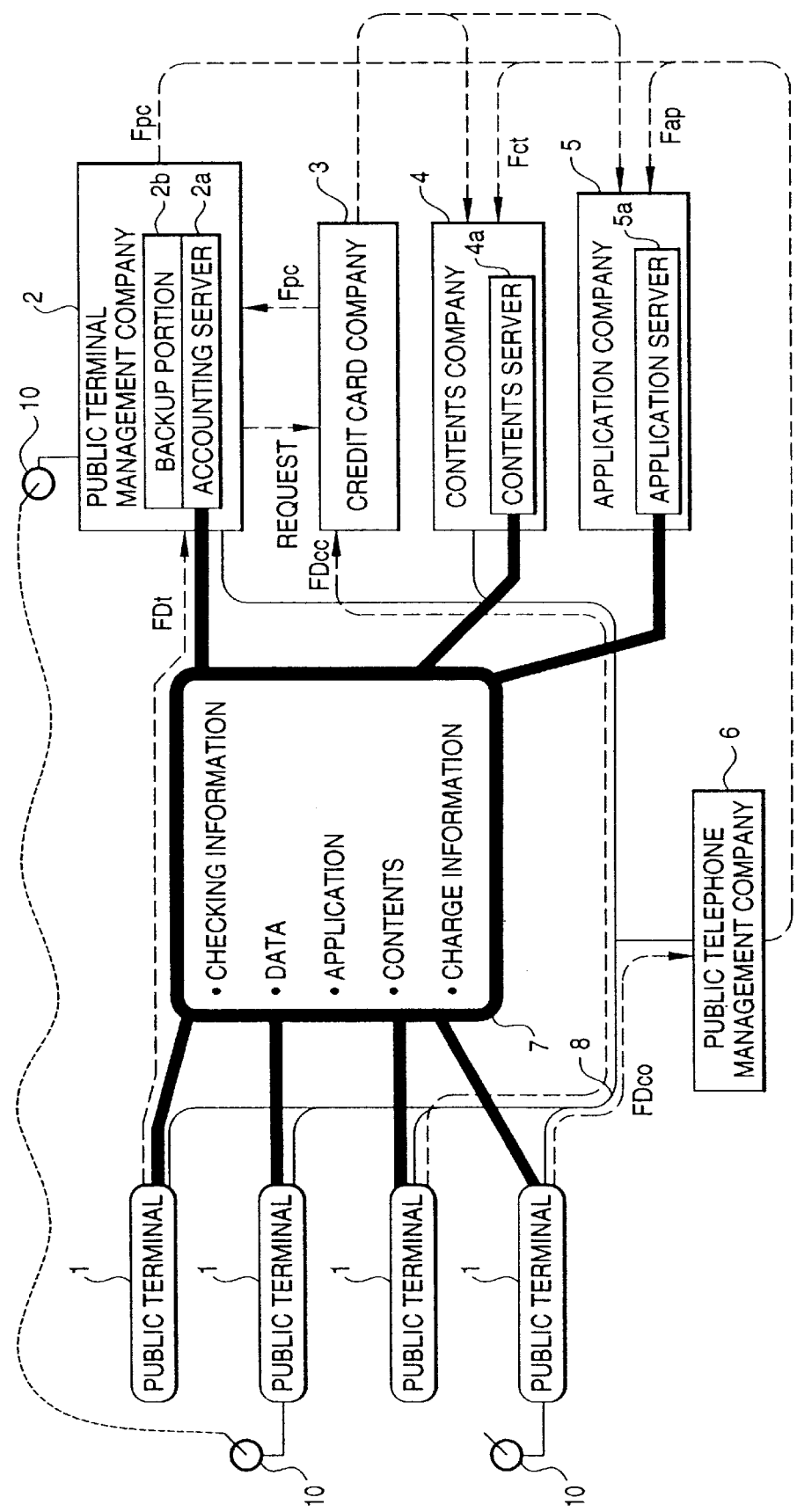
FIG. 1 is an explanatory view of a system network structure of an embodiment of the invention.

Preferred embodiments of the present invention will be described below in the following order. Incidentally, a computer terminal in the embodiments will be referred to as "public terminal" for explanation. As an example of a removable recording medium used in the public terminal, a disk media is cited.

1. System mode
2. Disk
3. Structure of public terminal
4. Type of backup operation system
5. Use procedure
6. Processing of public terminal
7. Modified example 1. System Mode A system mode example according to an embodiment will be described with reference to FIG. 1.

FIG. 1 shows structural elements of a system and an example of a charge collection system as a pay system.

As shown in FIG. 1, the system of this embodiment includes public terminals 1, a public terminal management company 2, a credit card company 3, a contents company 4, an application company 5, a public telephone management company 6, a network 7, a telephone line 8, a satellite communication section 10, and the like.

That is, the plurality of public terminals 1 each functioning as a computer terminal and a telephone terminal are connected to a plurality of server systems (accounting server 2a in the public terminal management company 2, contents server 4a in the contents company 4, application server 5a in the application company 5, and so on) through the network 7.

Further, the public terminals 1 are connected to the public telephone management company 6 and each server system through the telephone line 8. Some of the public terminals 1 are connected to the network through wireless communication by the satellite communication section 10.

In the public terminal management company 2 functioning as the server system, a section including a large capacity recording medium and provided with a writing/reading function of backup data to the recording medium is arranged as a backup section 2b. This backup section 2b operates to hold file data etc. transmitted from the public terminal 1 for a predetermined period as backup data.

The network 7 to which the public terminal 1 is connected means a communication network structured for the system, for example, as a LAN (Local Area Network). The network 7 is managed by, for example, the public terminal management company 2.

The telephone line 8 means a common public telephone line network managed by, for example, the public telephone management company 6.

The public terminal 1 is disposed at a place where some unspecified people can use, such as a store, station, school, and company.

As described later, each user can use the public terminal 1 as a so-called public telephone or can use the public terminal 1 as a pay or free computer unit by loading the public terminal 1 with a disk owned by the user. For example, it becomes possible to edit a data file recorded in the disk owned by the user, or to download or upload various data between the disk and the public terminal 1. Even if the disk is not loaded, the public terminal can be used as a terminal for executing, for example, information retrieval, preparation of a data file, and upload.

The public terminal management company 2 performs management of the public terminals 1 set at various places, registration of users, check processing for preventing dishonest use when the registered user uses, charge collection management to the use by the registered user, and so on. The accounting server 2a becomes a section for executing these processings.

As the need arises, it is possible to upload or download various data, applications, contents (file or the like as one information unit), or the like between the public terminal management company 2 and the public terminal 1.

Further, with respect to information which the user downloads by using the public terminal 1 and which requires update, the public terminal management company 2 periodically or irregularly supplies update data through the network 7 or the satellite communication section 10, and causes update at the side of the public terminal 1 to be executed.

For example, in the case where a daily electronic newspaper or the like is considered and a user is enabled to download information as the electronic newspaper to the user's own disk every day (or at desired time), electronic newspaper data of new contents are transmitted to the respective public terminals 1 and update is made, for example, each time the electronic newspaper is issued. By causing such update to be executed through the network 7 or the satellite communication section 10, it is possible to provide the newest data for download to the large number of public terminals 1 instantaneously and to the respective public terminals 1 without getting assistance from somebody.

Incidentally, not only the update is made through such network 7 or satellite communication section 10, but also the update may be made such that update data are distributed as, for example, a disk, and a person in charge at the place where each of the public terminals 1 is set (a clerk in the store, etc.) loads the public terminal 1 with the distributed disk, so that the contents of the download data are renewed.

The credit card company is a company which manages generally used credit cards. In the case where a registered user in the public terminal management company pays by a credit card, on the basis of the request from the public terminal management company 2, the credit card company charges a fee to the user's bank account and makes service of paying the value to the organization (public terminal management company 2, contents company 4, application company 5, etc.) entitled to receive the fee.

The contents company 4 is an organization capable of providing electronic information to be provided to unspecified many people, for example, electronic newspaper, electronic magazine, electronic book, music information (music, etc.), video information (television program, movie, video clip, etc.), as one piece of contents through the network 7 to the respective public terminals 1. Each of various kinds of information is stored as one piece of contents in the contents server 4a, and is transmitted to the public terminal 1 on the basis of the request at the side of the public terminal 1, or is periodically transmitted to each of the public terminals 1 to cause information update to be executed in the public terminal 1.

Of course, the contents company may have the satellite communication section 10 so that the contents can be provided to the respective public terminals 1 through satellite communication.

The application company 5 is an organization capable of providing applications as software to the computer system. That is, applications used at the public terminal 1 are provided from the application server 5 through the network 7 to the respective public terminals 1. Alternatively, in response to a request from some public terminal 1, the required application is provided.

The application company may have the satellite communication section 10 so that applications can be provided through the satellite communication to the respective public terminals 1.

The public telephone management company 6 is an organization for managing the public telephone line. The public terminal 1 can be used as a public telephone, and the public telephone management company 6 manages the use as the public telephone.

In such a system, functions capable of being realized by using the public terminal 1 become as follows:

The functions of the public terminal 1 are roughly divided into a function as a telephone terminal and a function as a computer terminal (information processing terminal).

In the case where the public terminal is used as the computer terminal, for example, it becomes possible to carry out editing (edit) of a data file or the like in a disk owned by the user, upload/download of data to or from the public terminal 1, upload/download of data through the network, various kinds of information retrieval from the network (or database or the like structured in the hard disk or the like in the public terminal), and so on.

The edit of a data file in this embodiment means a processing that the user accesses a data file previously recorded in the user's disk through the public terminal 1 and edits the data file to update the file contents in the disk, a processing that the user newly prepares a data file by the public terminal 1 to record the data file in the disk, and so on. Of course, it is not always necessary to write the data edited with the public terminal 1 into the disk.

The upload/download of data to or from the public terminal 1 means such a function that the user uploads some data file to a storage medium (for example, a hard disk) in the public terminal 1, or the user downloads a data file, application, contents, and the like recorded in the hard disk or the like to the user's own disk.

The upload/download of data through the network 7 means such a processing that the user executes upload/download of some data to or from sections connected through the network (or sections where wireless communication can be made through the satellite communication section 10), for example, other public terminals 1, the public terminal management company 2, the contents company 4, the application company 5, and the like.

For example, the upload becomes such an operation that the user provides a data file such as an electronic mail or contents prepared by the user onto the network.

The download becomes such an operation that the user downloads a data file, application, contents (an electronic publication, music software, video software, game software, etc.) as information provided from sections connected to the network to the user's own disk.

Next, modes of charge payment will be considered. First, it is possible to provide the use of the public terminal 1 to the public (or only people in some organization) without charge. As the case of free provision, such an example is conceivable that several public terminals 1 are disposed in a school, and the students or the staff of the school can freely use the public terminals 1 to carry out processing based on the foregoing respective functions.

In the case of charging a fee, it is possible to consider payment from a credit card (bank account, etc.) by payment registration of the user to the public terminal management company 2, payment by money or a prepaid card, payment by loading of a credit card, and so on.

With respect to the credit card payment by the payment registration, for example, the public terminal management company 2 manages.

When purchasing a disk, the user makes a registration procedure that he or she uses the disk to use the public terminal 1 and pays by a credit card.

When the public terminal management company 2 receives the registration procedure, the user can use the public terminal 1 thereafter by using the disk even if he or she does not have money or a prepaid card.

In this case, when the user uses the public terminal 1, a strict check is made for the loaded disk and the user by both the public terminal 1 and the accounting server 2a. If the check is OK, the use becomes possible.

With respect to this check, a disk serial number, a user ID, a password, and the like are used.

When the use is ended, for example, as shown in FIG. 1, information FDt of the use fees is sent to the accounting server 2a from the used public terminal 1.

The public terminal management company 2 shows the use fees (public terminal use fee, contents use/purchase fee, application use/purchase fee, etc.) of the user to the credit card company 3 on the basis of the management of the accounting server 2a, and charges the public terminal use fee Fpc. Based on the use fees shown by the public terminal management company 2, the credit card company 3 charges the use fees to the user's bank account, and pays the public terminal use fee Fpc to the public terminal management company.

In the case where contents provided by the contents company 4 is used or purchased at the use of the public terminal, the credit card company 3 pays the contents use/purchase fee Fct to the contents company 4.

Further, in the case where an application provided by the application company 5 is used or purchased at the use of the public terminal, the credit card company 3 pays the application use/purchase fee Fap to the application company 5.

Incidentally, the public terminal use fee Fpc among the use fees is a fee to be paid by the user in accordance with, for example, a use time of the public terminal 1.

The contents use/purchase fee Fct is a fee to be paid in the case (purchase) where the user downloads the contents into the user's own disk, or in the case where the user uses the contents in the public terminal 1 (for example, reads an electronic newspaper).

The application use/purchase fee Fap is a fee to be paid in the case where the user downloads (purchases) an application to the user's own disk, or in the case where the user uses the application for processing in the public terminal 1.

Further, in the case of this embodiment, as described later, when the user uses the public terminal 1 to edit or prepare a data file, there is a case where the user saves the data under the preparation or just before or after the preparation for backup into the hard disk in the inside of the public terminal 1 or into the backup section of the public terminal management company 2. As the backup operation system, as described later, there are plural operation systems classified according to levels of backup capacity, and one of them is selectively executed. At this time, in the case where the fee is set according to the executed backup operation system, the fee is also included in the public terminal use fee Fpc.

Next, payment with money (coin or bill) or a prepaid card is also conceivable.

In this case, when the public terminal 1 is used as a computer by using a coin or a prepaid card, the public terminal transmits the information FDco of the use fees through, for example, the telephone line 8 to the public telephone management company 6.

On the basis of the transmitted use fees (public terminal use fee, contents use/purchase fee, application use/purchase fee, etc.) of the user, the public telephone management company 6 pays the public terminal use fee Fpc to the public terminal management company.

Besides, in the case where contents provided by the contents company 4 are used or purchased at the use of the public terminal, the public telephone management company 6 pays the contents use/purchase fee Fct to the contents company 4. Further, in the case where an application provided by the application company 5 is used or purchased at the use of the public terminal, the public telephone management company 6 pays the application use/purchase fee Fap to the application company 5.

Besides, as a fee payment mode, like an example of a public telephone set in recent years, such a system is also conceivable that a credit card is directly loaded into the public terminal 1 to use it. In this case, the public terminal 1 must have a processing function for a credit card.

In the case where the public terminal 1 is used in such a payment system, the public terminal 1 transmits information FDcc of the use fees through, for example, the telephone line 8 to the credit card company 3.

On the basis of the transmitted use fees (public terminal use fee, contents use/purchase fee, application use/purchase fee, etc.) of the user, the credit card company 3 performs charging of fees to the user's bank account, payment of public terminal use fee Fpc to the public terminal management company 2, payment of contents use/purchase fee Fct to the contents company 4, payment of application use/purchase fee Fap to the application company 5, and so on.

Although explanation has been made on the structural elements as a computer system, fee payment modes, and functions of the public terminal 1 in FIG. 1, these are merely an example of a system corresponding to specific structures and operation functions described in the following. Particularly, extremely wide variations are conceivable for the mode of structure constituting a computer system (number and kinds as a server system) and the like, and according to that, various kinds of network connection modes, fee collection systems, and the like are formed.

2. Disk

Next, a disk 90 used as a recording medium owned by a user in this embodiment will be described.

The user owns a disk (disk main body) corresponding to the public terminal 1 and uses it, so that various uses of the computer using the public terminal 1 become possible.

In this embodiment, even if the disk 90 described in the following is not owned, the public terminal 1 can be used as a telephone and a computer terminal. However, when the public terminal is used as the computer terminal without using the disk 90, it becomes naturally impossible to download data or the like to the disk, and so on.

Besides, information for a check on a user to prevent dishonest use and the like is also recorded in the disk described here, and this becomes important in the case where payment is made through registration of a credit card. Thus, in the case where the public terminal 1 is used without using the disk, such a system is also conceivable that payment of fees by the registration of a credit card can not be made (only the use by a coin, prepaid card, or the like is admissible).

As the disk 90 used in this embodiment, it is preferable that the disk is a data writable disk and includes an area in which data rewriting can not be made. Thus, a RAM disk shown in FIG. 2A or partial ROM disks shown in FIGS. 2B and 2C are used. Here, an optical disk is used as the disk.

Figure 2A:
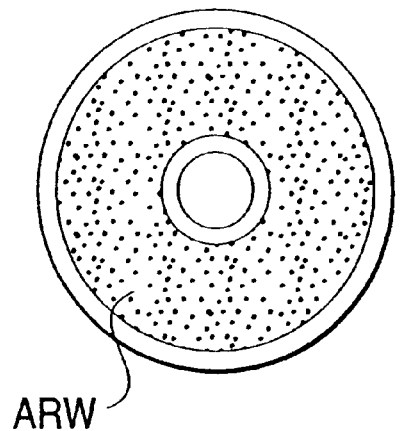
FIGS. 2A to 2C are explanatory views of a disk of an embodiment.
Figure 2B:
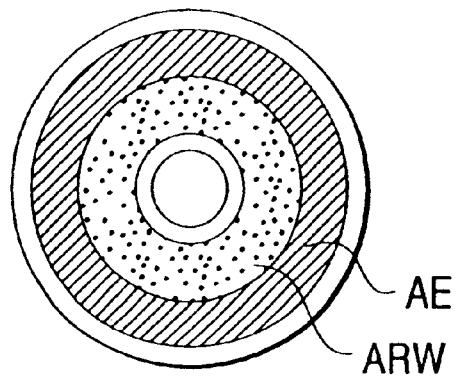
Figure 2C:
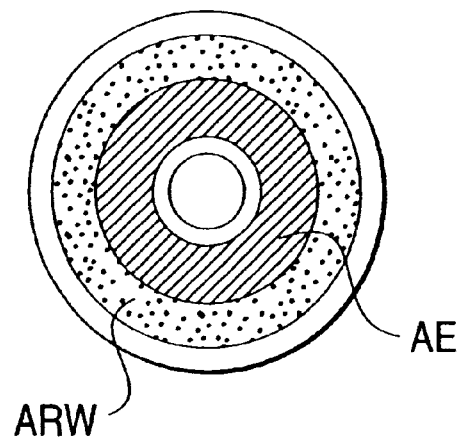

In the RAM disk of FIG. 2A, its whole main data area is made a rewritable area ARW in which recording/reproducing can be made with a magneto-optical area, a phase change area, or the like. In the case of this RAM disk, since all of the main data area physically becomes the rewritable area, it is necessary to partially set an area for recording data which can not be rewritten, so that write protection is made to some area by disk managing information.

The partial ROM disk is a disk having a structure as shown in, for example, FIG. 2B or 2C. That is, in a main data area of one disk, a ROM area AE and a rewritable area ARW are provided.

The ROM area AE is an area where data are recorded by so-called emboss bits or the like, that is, it is a region where data rewriting is impossible also from a physical viewpoint.

Such a partial ROM disk is most suitable for the condition that data can be written and there is a region where data rewriting is impossible, which is required for a recording medium of the computer system of this embodiment.

Figure 3:
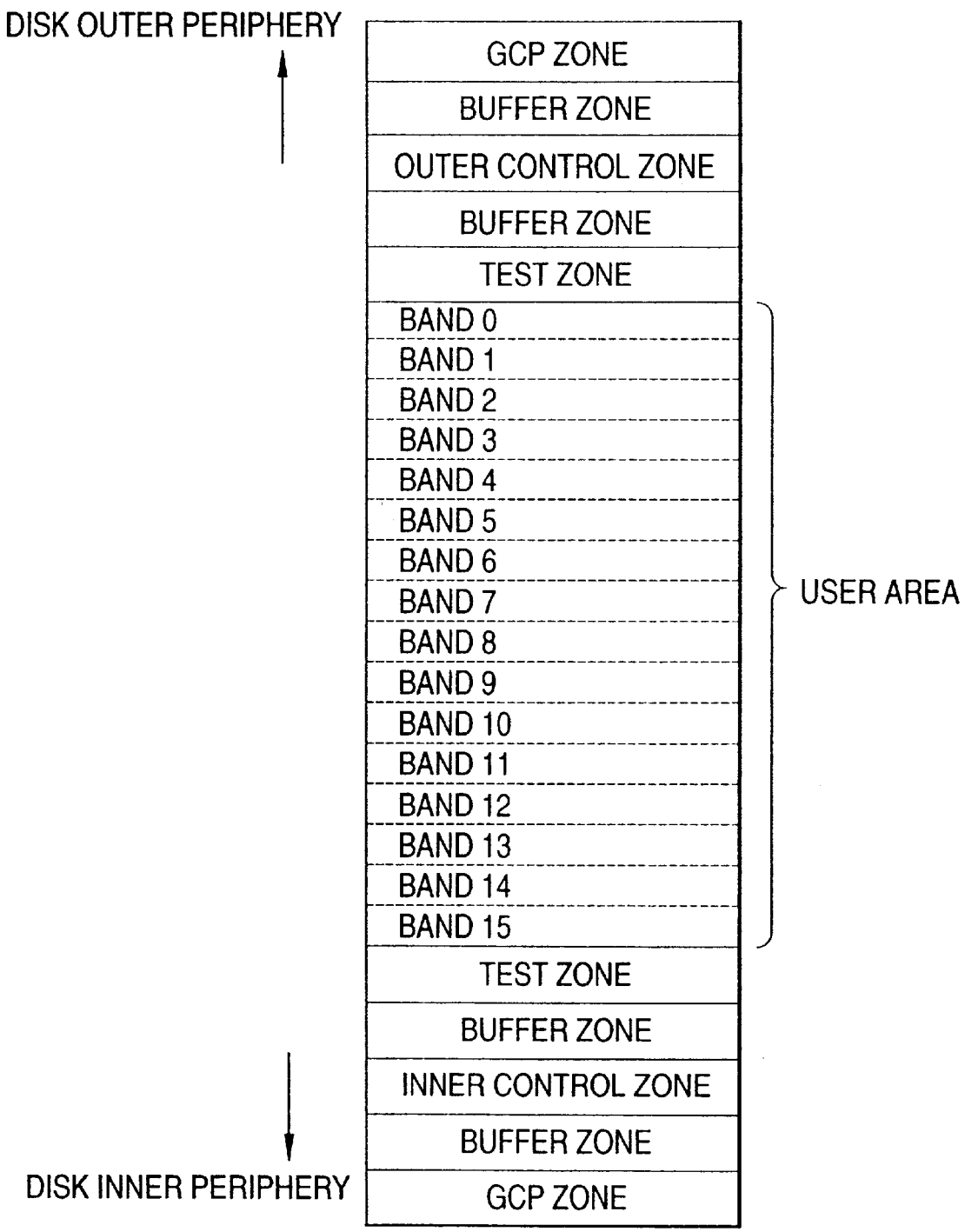
FIG. 3 is an explanatory view of an area structure of a disk of an embodiment.

FIG. 3 shows an example of an area structure from an outer periphery side to an inner periphery side, which is common to each of the disks of FIGS. 2A to 2C, each becoming the recording medium of this embodiment.

For example, at the outermost periphery side, a GCP (Gray Code Part) zone is provided, and a buffer zone, an outer control zone, a buffer zone, and a test zone are provided toward the inner periphery side.

Subsequent to the test zone, there is formed a user area as a main data area composed of a rewritable region ARW in which the user can record desired data or a ROM region AE used only for reproduction. The user area is divided into 16 bands of band 0 to band 15.

In the RAM disk of FIG. 2A, the entire user area becomes the rewritable region ARW. One or plural specific bands are controlled to become an area only for reproduction so that rewriting can not be made.

In the partial ROM disk as in FIG. 2B or 2C, a part of the bands 0 to bands 15 becomes the ROM region AE of emboss bits, and a part thereof becomes the rewritable region ARW as a magneto-optical region or the like.

A manufacturer side can freely determine how many bands in 16 bands are made the rewritable area ARW and how many bands are made the ROM area AE.

Although FIGS. 2B and 2C show the examples in which the rewritable area ARW and the ROM area AE are divided at the inner periphery side and the outer periphery side of the user area, the rewritable area ARW and the ROM area AE may be formed over non-adjacent bands.

At the inner periphery side of the user area, a test zone, a buffer zone, an inner control zone, a buffer zone, and a GCP zone are provided.

The GCP zone, the outer control SFP zone, and the inner control SFP zone formed at the outer periphery and inner periphery of the user area are made management areas in each of which predetermined control information is recorded.

Figure 4:
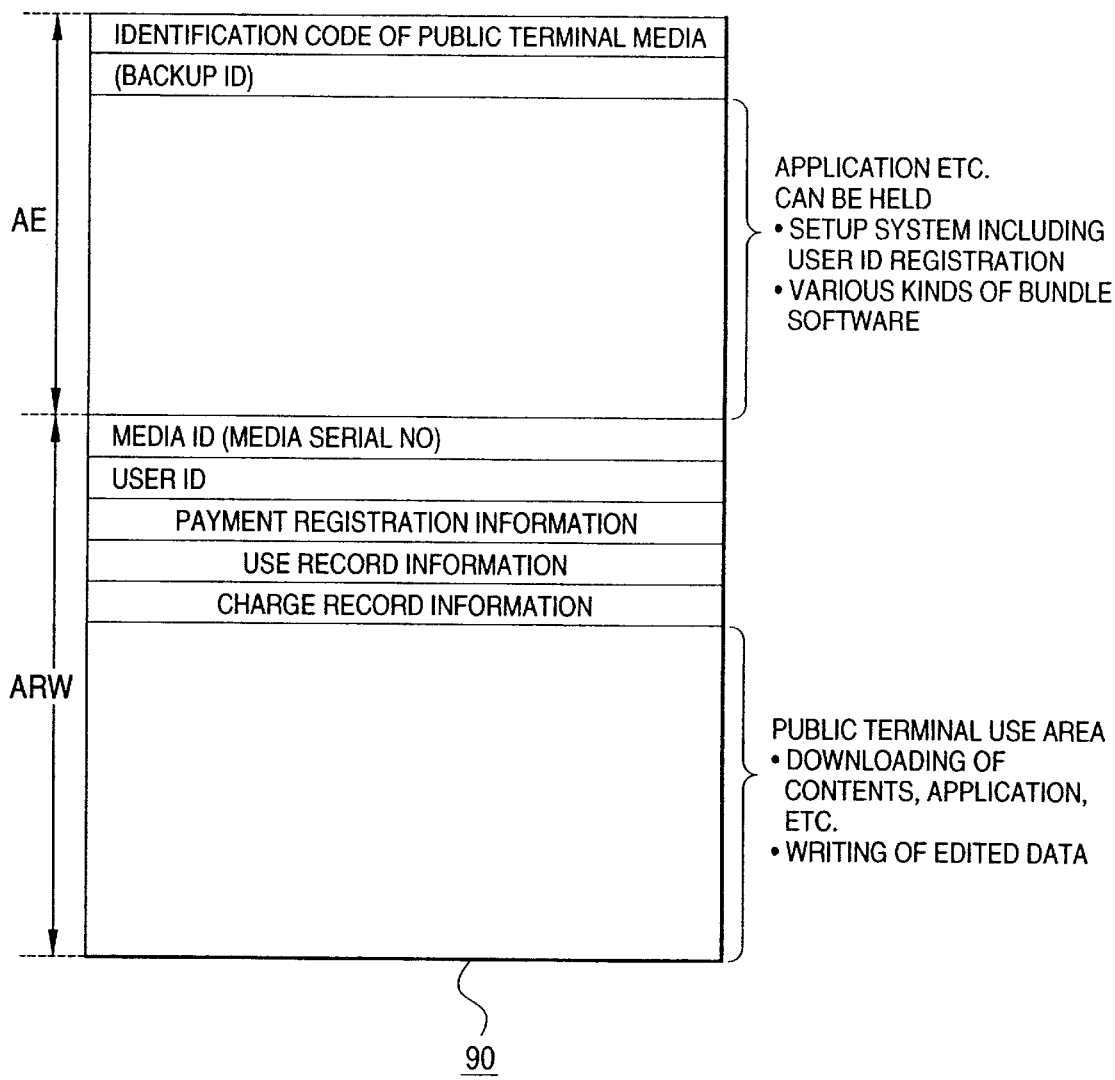
FIG. 4 is an explanatory view of information recorded in a disk of an embodiment.
Figure 5:
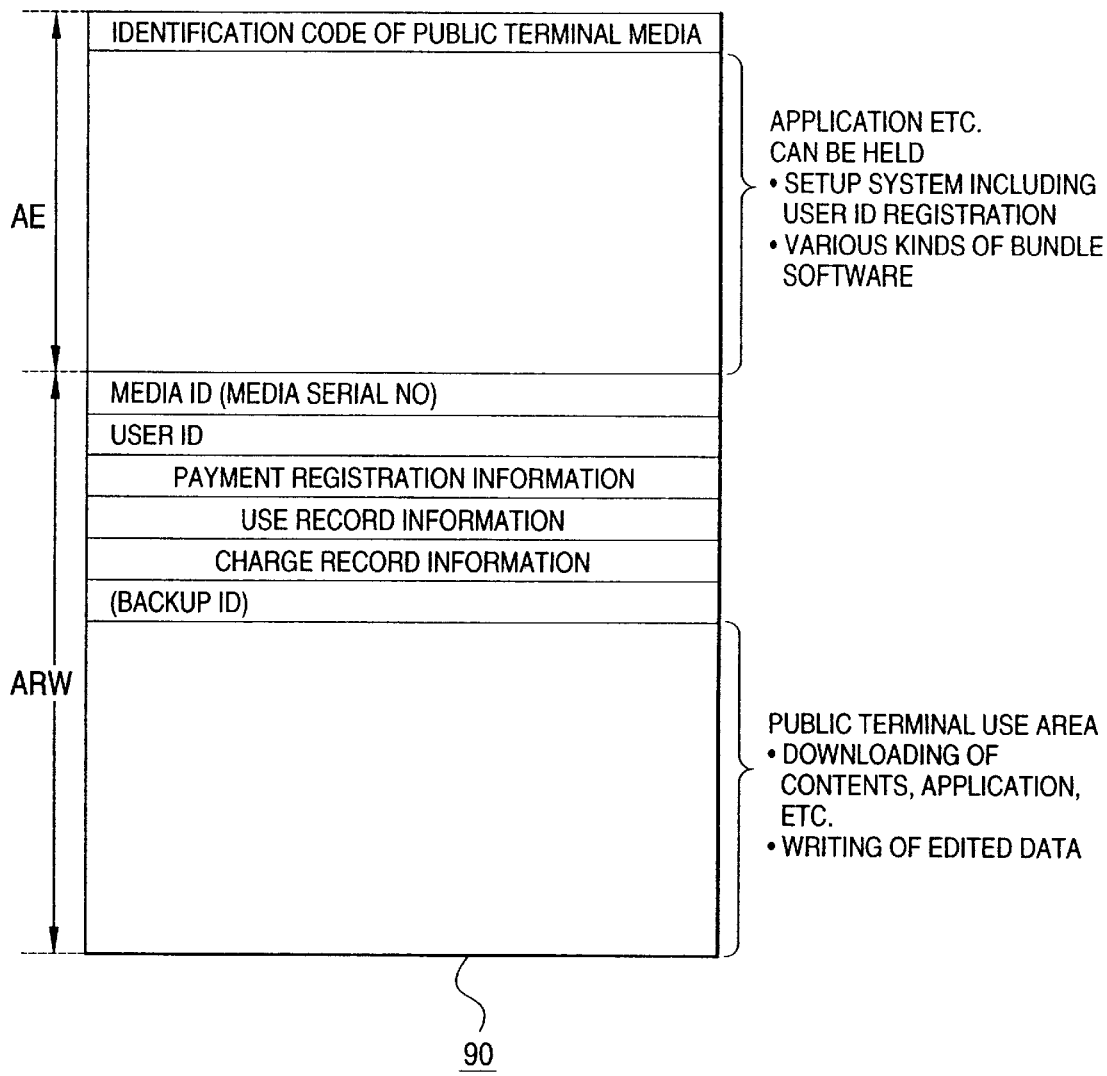
FIG. 5 is an explanatory view of information recorded in a disk of an embodiment.
Figure 6:
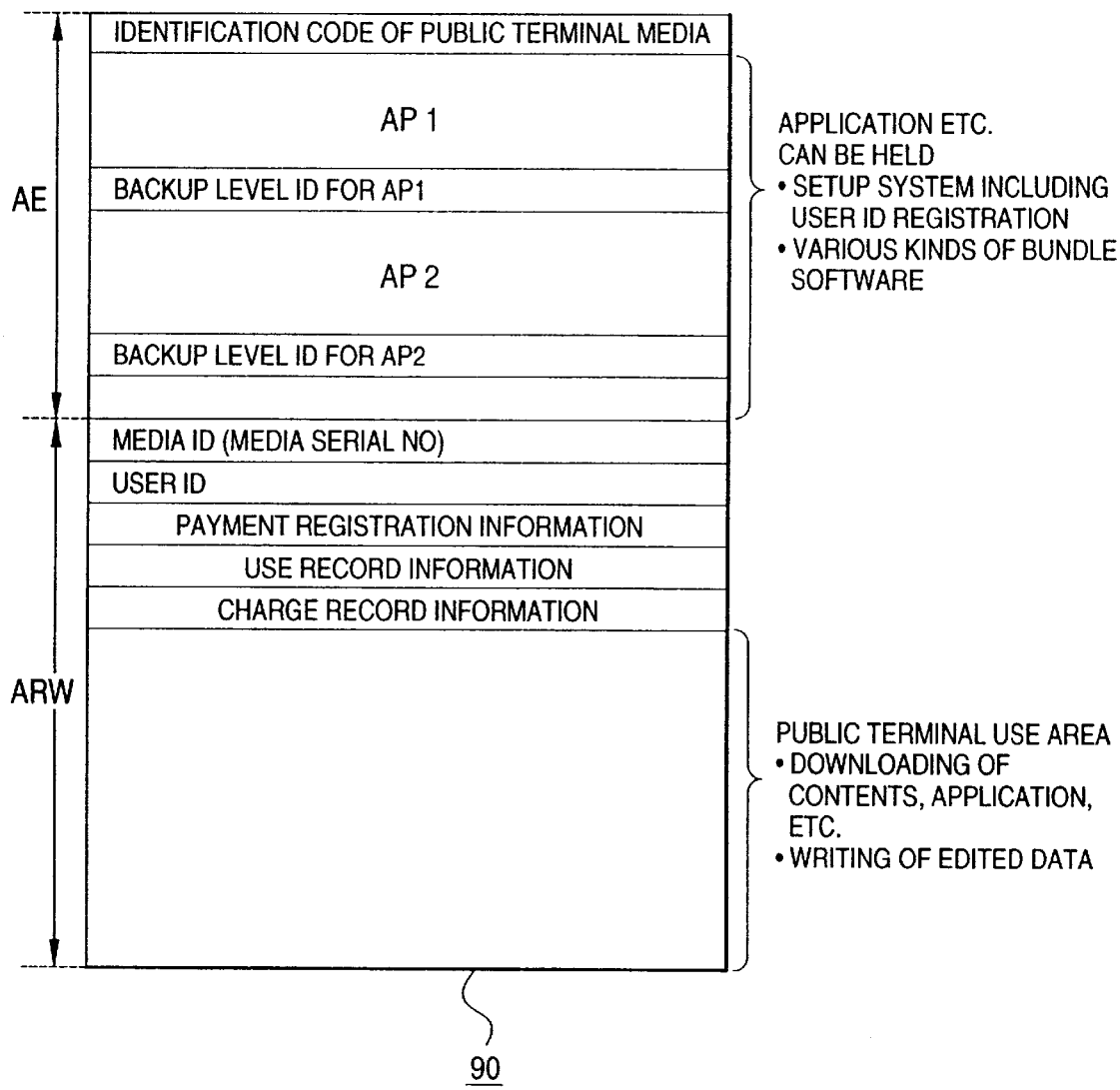
FIG. 6 is an explanatory view of information recorded in a disk of an embodiment.

In the disk 90 as such partial ROM disk or RAM disk, information as in examples of FIGS. 4 to 6 is recorded when the public terminal 1 is used.

FIG. 4 shows the ROM area AE of the user area as the partial ROM disk (or write protected area in the RAM disk) at the upper side, and the rewritable area ARW of the user area at the lower side, and further shows information to be stored in each area.

Incidentally, although the user area is used in this embodiment, it is also conceivable that a format is set so that the illustrated information is recorded in the management area such as the control zone. Besides, the format as shown in FIG. 3 is also an example, and it is not always necessary to set the disk 90 into the format as shown in FIG. 3.

First, in the case of FIG. 4, in the ROM area AE (or write protected area) of the disk 90, that is, in the area where the user can not rewrite, an identification code indicating that the disk is a media corresponding to the public terminal 1 is recorded. In the case of the partial ROM disk, the disk 90 is manufactured in such a state that this identification code is recorded in emboss bits.

Like this, by loading the public terminal 1 with the disk 90 of this embodiment in which the identification code corresponding to the public terminal is recorded, it becomes possible to edit file data recorded in the disk 90, to upload data recorded in the disk, to download contents or the like to the disk, and so on.

In this embodiment, as the disk 90 corresponding to the public terminal 1, there is also a disk in which a backup ID as identification information to specify a backup operation system described later is recorded.

That is, the information is such that when information processing (file editing, preparation, etc.) is carried out in the public terminal 1 by using the disk 90, identification is made on whether or not a backup operation of data is executed, and if executed, what backup operation should be executed, and so on.

It is appropriate that such backup ID is written by the disk manufacturer side according to, for example, the kind of application contained in the disk 90.

As information recorded in the rewritable area ARW of the disk 90, the media ID is first recorded.

This media ID is a code corresponding to a serial number of the disk, that is, is a code given to each disk as a serial number just before the shipment of the disk 90 and becomes a number (media serial number) intrinsic to each disk.

Not only this media ID is written in the disk 90, but also, for example, a code as the media ID is attached to a package or the like of the disk 90, so that the user who purchased the disk can know the code number as the media ID.

An area in which the user ID is recorded is arranged in the rewritable area ARW, and as user ID, the user who purchased the disk 90 sets arbitrary values or character lines and records them. This user ID has a meaning of a personal identification number when the user uses the public terminal 1 by using the disk 90, that is, the user ID makes it possible to allow only a person who knows the personal identification number as the user ID to use the disk 90.

It is appropriate that record of the user ID to the disk 90 can be made by the user from the public terminal 1 or the user's own personal computer.

In the rewritable area ARW, there is provided an area in which payment registration information is recorded. This area includes a record that this is a disk in which registration payment is made possible when the user performs credit card payment registration to the public terminal management company 2 to make registration payment. This payment registration information can be recorded from, for example, the public terminal 1 or the computer owned by the user.

For example, it is designed such that when the user registers a credit card before the use of the public terminal 1, a registration number is sent from the public terminal management company 2 to the user. Then, when the disk 90 is used at the public terminal 1, it is conceivable to make such that when the user inputs the registration number after loading the disk 90, a check processing is carried out between the public terminal 1 and the public terminal management company, and if the check is OK, it is recorded that the disk is one in which registration payment is made possible.

Further, use record information and fee record information are recorded in the rewritable area ARW.

The use record information is information of use contents or the like each time the public terminal 1 is used with the disk 90, and each time the public terminal 1 is ended, and its contents are updated (addition of the use record) by the public terminal 1.

For example, there are recorded a use date of the public terminal 1, an edited file name, a name of downloaded contents, application, or the like, an uploaded file name, a name of an organization of a download source, a name of an upload target, and so on.

For example, like this, the contents which the user has performed by using the public terminal 1 are respectively recorded in the use record information. Of course, the contents are not limited to the exemplified contents, but if other processing contents can be made, those contents are also recorded. For example, in the case where data provided as contents are not downloaded to the disk 90, but the data are only seen at the display section 11 of the public terminal 1, such is made the use of the contents, and the name of the used contents, use start time, use end time, and the like are recorded.

There is a case where plural pieces of information of the same content are recorded. For example, in the case where a plurality of applications are downloaded in the disk 90, the names of the respective applications are recorded.

Next, the charge record information is information as to a fee to be paid each time the public terminal 1 is used with the disk 90, and each time the use of the public terminal 1 is ended, and its contents are updated (addition of the fee record) by the public terminal 1.

As examples of the charge record information, for example, a public terminal number set for each public terminal 1 to identify the used public terminal 1, and a public terminal use fee as a fee to be paid for the use of the public terminal 1 are recorded. When the public terminal 1 adopts a system in which accounting is carried out according to a use time, the use time is recorded together with the use fee. Besides, the method of payment selected by the user at the use is also recorded. That is, it is recorded whether payment is made by credit card registration or whether payment is made by insertion of a coin or prepaid card.

Further, as accounting contents according to the actual use of the public terminal, information corresponding to the use contents is recorded.

For example, in the case where the user uses the public terminal 1 to perform file edit or the like, and in the case where an application held in the user's own disk 90 is started, the case is naturally free of charge since the application is owned by the user.

On the other hand, in the case where an application is started from the hard disk drive in the public terminal 1 or the network 7, the use fee of the application is required to the user (of course, there can be an application provided without charge). In such a case, the application use fee is recorded. If a system in which accounting is made according to the use time is adopted for the application use fee, the use time is recorded together with the use fee.

Although not exemplified, with respect to data and contents as well, in the case where one requiring a charge for its use is used, the contents use fee and the data use fee are recorded.

That the user downloads an application, data, contents, and the like into the user's own disk 90 has a meaning of purchase of so-called software.

Thus, in the case where the user downloads an application, data, contents, or the like and there is a charge for its provision, the download fee (purchase fee) is recorded.

Incidentally, together with the use fee and download fee of the application, data, contents, or the like, the provision source of the application, data, contents, or the like may be recorded.

For example, like this, the accounting contents when the user uses the public terminal 1 and makes execution are recorded in the charge record information. Of course, there is a case where plural pieces of information of the same content are recorded. For example, in the case where a plurality of applications are downloaded into the disk 90, the download fees as to the respective applications are recorded respectively.

In the rewritable area ARW shown in FIG. 4, for example, as described above, the media ID, the user ID, the payment registration information, the use record information, and the charge record information are recorded.

Although these pieces of information are recorded in the rewritable region ARW, it is necessary to make such that these other than the payment registration information can not be freely rewritten by the user.

First, write protection is made so that the media ID is put in a state where rewriting can not be made. It is appropriate that the user ID is made such that rewriting can not be made after the user ID is once written. The use record information and charge record information are made such that only the public terminal 1 can make update. Such a case is also conceivable that it is preferable to make rewriting of the payment registration information impossible after it is once written.

It is conceivable that such rewriting management is realized by managing all or part of the media ID, the user ID, the payment registration information, the use record information, and the charge record information as an inaccessible file (hidden file which is not seen by the user) by, for example, the mode of a management file of the disk 90 or a disk-oriented program at the side of the public terminal 1.

Besides, in order to improve security by means of the disk 90 itself, that is, to make dishonest use of the disk 90 impossible, it is also conceivable that all or part of the media ID, the user ID, the payment registration information, the use record information, and the charge record information is coded and recorded.

Although the information recorded in the ROM area AE (or write protected area) and the rewritable area ARW of the disk 90 is set as described above, the remaining area in the rewritable area ARW is made a use area of the public terminal 1.

That is, the remaining area is used for record of a data file edited by the public terminal 1, or as a storage area of downloaded data, application, and the like.

On the other hand, as the ROM area AE, although only the section of the identification code area may be provided, such an example is also conceivable that a ROM area AE is also set in a section other than the section of the identification code (and backup ID) area as shown in FIG. 4, and an application and a setup system are recorded in this ROM area AE.

For example, when the partial ROM disk or RAM disk is used, there is also a case where it is necessary for the side of the user to carry out management of a defect area or a format processing to, for example, form file management information. In that case, when a format program (setup system) for executing the format is recorded in the disk, it becomes possible to format the disk 90 even if the format program is not held in the public terminal 1 or the personal computer owned by the user.

Besides, as described above, although it is necessary for the user side to input the user ID, if a program for writing the user ID is recorded, it becomes possible to write the user ID by not only the public terminal 1 but also the personal computer owned by the user.

Further, as service to a purchaser of the disk 90, it is conceivable that applications as so-called bundle software are recorded so that the use of the public terminal 1 is made convenient.

Next, although an example of FIG. 5 is basically the same as FIG. 4, in this example, a backup level ID is recorded in a rewritable area ARW.

As in the case of FIG. 4, in the case where the backup level ID is recorded in the ROM area AE, a disk manufacturer side normally writes it. Thus, there can be a case where a backup operation which a user, who purchased the disk, does not desire is specified by the backup level ID.

Then, in this example, the backup level ID is recorded in the rewritable area ARW so that the user can rewrite the backup level ID itself.

Further, in an example of FIG. 6, a plurality of backup level IDs are recorded.

For example, in the case where the side of the disk manufacturer records a plurality of application programs AP1, AP2 . . . in the ROM region to provide the user with them, consideration is given to a backup level which becomes suitable at the time of information processing using each of the applications AP1, AP2 . . . , and the backup level ID corresponding to each of the applications AP1, AP2 . . . is recorded.

Thus, for example, in the case where the user loads the public terminal 1 with the disk 90 and executes information processing by using the application AP1, it is possible to make such that the backup operation corresponding to the backup level ID for the application AP1 is carried out.

Although not shown, for example, it is also possible for the user to set and record the backup level ID individually to an application or data file which has been recorded in the rewritable area ARW by processing such as download.

It is not always necessary to make one-to-one correspondence between the backup level ID and the data file/application or the like, and various recording modes of the backup level ID are conceivable according to the circumstances of the disk manufacturer or the user side.

Besides, in each example, although the backup level ID is recorded in the disk, even if the backup level ID is not recorded, as long as the identification code indicating that the disk is a media corresponding to the public terminal 1 is recorded, the disk is made one which can be used in the public terminal 1.

Examples of processing of the public terminal 1 corresponding to each of a disk in which the backup level ID is recorded and a disk in which the backup level ID is not recorded will be described later.

Incidentally, in this embodiment, although the disk media is cited as an example of the recording medium, for example, it is also possible to use other kinds of data writable recording medium such as an IC card and a memory cassette instead of the disk.

3. Structure of Public Terminal

Figure 7:
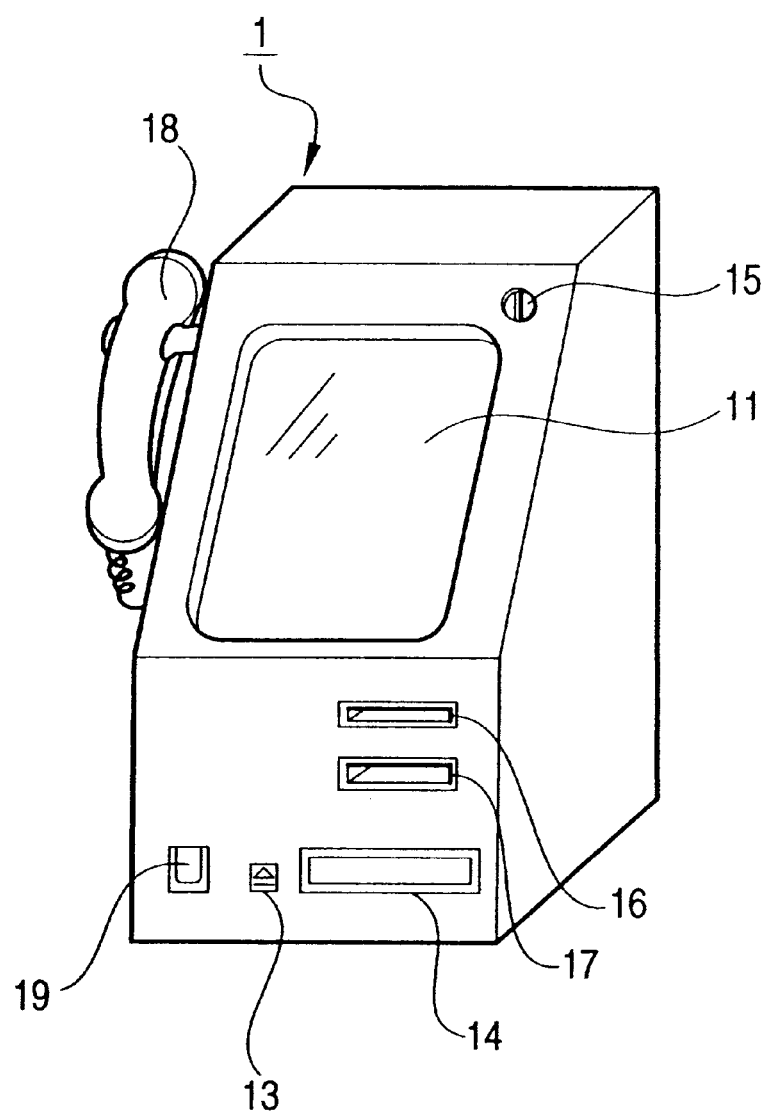
FIG. 7 is an explanatory view of an example of an outer appearance of a public terminal of an embodiment.

FIG. 7 shows an example of an outer appearance of the public terminal 1.

This public terminal 1 is set at a store or the like on the assumption that the public use it. For example, in this example, the public terminal has the outer appearance similar to a normal public telephone.

As shown in FIG. 7, a display section 11 using a liquid crystal panel, a cathode ray tube (CRT) or the like is formed at the front upper section of the public terminal 1, and various kinds of image display at the use of the public terminal 1 are made.

In the case where the user uses the public terminal 1 as a computer terminal, for example, an input section such as a keyboard becomes necessary. In the case where the user uses' it as a telephone, a push dial key or the like becomes necessary. In this structural example, a mechanical input key such as a keyboard or a push dial key is not formed.

Although the detail will be described later, in this embodiment, there is provided a touch sensor mechanism (touch sensor 33 in FIG. 8) for detecting a position on the screen of the display section 11 which the user touches by a finger or the like. Further, display of a keyboard, display of a push dial key, and display of various required operation buttons are made on the display section 11. That is, it is designed such that the user can execute various kinds of operation input by carrying out operations of pressing each key on the image such as the keyboard displayed on the display section 11.

However, of course, it does not matter if a mechanical input key section such as a keyboard or an input mechanism such as a mouse is arranged. Further, it is also conceivable that a voice recognition mechanism is provided to enable voice input.

When the public terminal 1 is used, there is a case where the disk 90 owned by the user is loaded, and a disk tray 14 is provided as a section where this disk is loaded.

The disk tray 14 is pulled out from the inside of the unit when the user presses an eject key 13. In this state, the user puts the disk 90 on the disk tray 14, and again operates the eject key 90, so that such a state is realized that the disk tray 14 is housed. In this state, the disk 90 is placed in such a state that it is loaded in an inside disk drive (disk drive 24 of FIG. 8), and recording and reproducing operation to the disk 90 becomes possible in the public terminal 1.

In this public terminal 1, as the charge payment mode of the user, as described above, the user can select payment by credit card registration, or payment by insertion of money, a prepaid card, or a credit card.

For the purpose of dealing with the payment by the insertion, there are provided a coin insertion section 15, a prepaid card insertion section 16, and a credit card insertion section 17 as shown in the drawing.

Incidentally, a coin return port 19 is arranged for returning change, which is used in the case of the coin insertion.

This public terminal 1 is connected to both the network 7 and the telephone line 8 of FIG. 1. It is designed such that the public terminal is connected to the telephone line 8 and is provided with the function of a public telephone, so that it can be used as the public telephone as well. A receiver-transmitter 18 as shown in the drawing is provided as a handset used for a telephone call by a user.

The receiver-transmitter 18 is held in a state where it is hung on a hook, and in the case where the user uses the public terminal as a telephone to make a telephone call, the user picks up the receiver-transmitter 18 from the hook and uses it.

Figure 8:
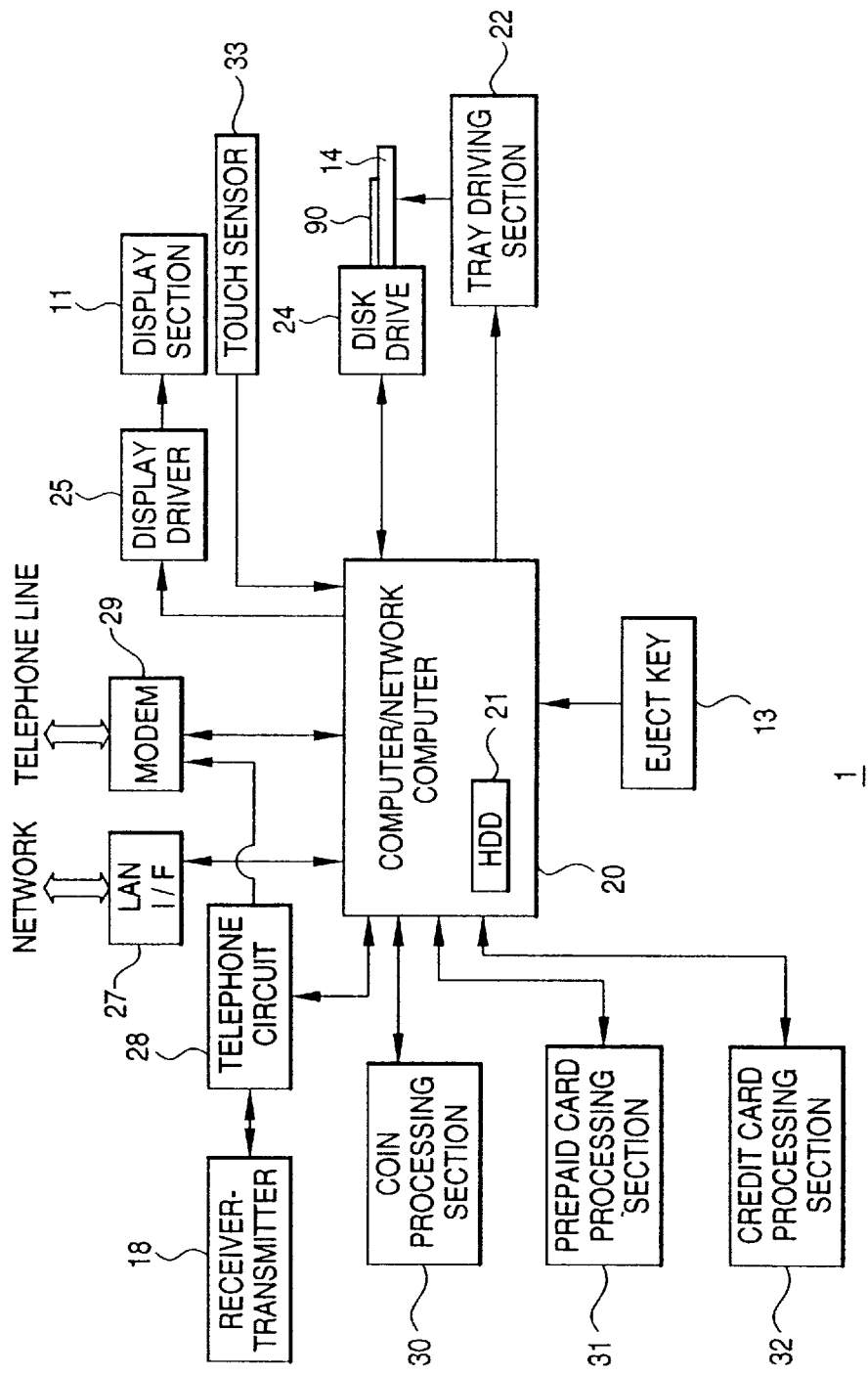
FIG. 8 is a block diagram of a public terminal of an embodiment.

FIG. 8 shows an inner structure of the public terminal 1.

A computer/network computer 20 (hereinafter referred to as a computer 20) is a unit section in which the public terminal 1 executes various kinds of processing as a so-called computer, and is provided with a CPU for executing arithmetic/control processing, a RAM section as a main storage area, a ROM section storing an OS (Operating System) and other programs, an interface function to each section in the public terminal 1, an interface function to the network 7 and the telephone line 8, and the like, any of which is not shown.

As an internal storage medium, a hard disk drive 21 is included.

Concerning the disk 90 loaded from the foregoing disk tray 14, contents and the like are recorded/reproduced in the disk drive 24.

The computer 20 instructs a tray drive section 22 to eject or house the disk tray 14 in response to pressing of the eject key 13, and in response to this, the tray drive section 22 drives a not-shown tray moving motor and a tray moving gear system to eject or house the disk tray 14. For example, at the end of the use of the public terminal 1, even if the operation of the eject key 13 is not made, the computer 20 instructs the tray drive section 22 to eject or house the disk tray 14.

The disk drive 24 executes a recording/reproducing operation to the disk 90 loaded in the disk drive 24 in accordance with a read/write request from the computer 20.

That is, the computer 20 transmits a read command, read position address, data length, and the like to the disk drive 24, so that the disk drive 24 executes a reading operation according to the instruction, and transmits the read data to the computer 20. Besides, the computer 20 transmits a write command, write position address, data length, file data to be written, and the like to the disk drive 24, so that the disk drive 24 executes a writing operation according to the instruction, and records the transmitted data file in the disk 90.

On the display section 11, as a monitor screen of so-called computer processing/operation, a GUI image, a sentence under processing such as editing, images, and the like are displayed. The computer 20 gives a display driver 25 information to be displayed, and the display driver 25 causes the display section 11 to make display.

Only the eject key 13 is disposed as a mechanical operation key to the computer 20 on a box. Other input operation keys are displayed on the display section 11, and the contents of operation input are detected with detection of a pressed position to the screen by the touch sensor 33.

That is, the computer 20 causes the display section 11 to make keyboard display, menu icon display, function key display, and the like, and monitors a pressed position of the user to the screen with the touch sensor 33.

The touch sensor 33 detects a position on the screen in a plane direction, for example, in x and y coordinates, and in the case where the user touches a place on the screen, the coordinate data thereof are supplied to the computer 20.

When the coordinate data are supplied, the computer 20 discriminates an operator (image such as a key) corresponding to the position of the coordinate data in the content displayed on the display section 11. The computer judges that the operation content by the discriminated operator has been inputted.

Thus, in the case where the computer 20 causes an image like a keyboard to be displayed on the display section 11, the user can perform various kinds of input by touching each key of the keyboard on the screen.

The same applies to the case of use as a telephone, and the computer 20 causes the display section 11 to display an image like a push dial key, so that the user can input a desired telephone number by pressing the push dial on the screen.

The public terminal 1 in this embodiment includes a LAN interface 27, and is connected to the network 7. By this, the computer 20 can execute data communication with each section connected to the network 7 as shown in FIG. 1.

The computer 20 is connected to the telephone line 8 through a modem 29, so that data communication through the telephone line 8 is also made possible. Further, a telephone circuit 28 and the receiver-transmitter 18 are included, so that the use as a public telephone is also made possible.

For example, when the computer 20 detects through the telephone circuit 28 that the receiver-transmitter 18 is made to be off the hook (picked up by the user), it enters into a control mode as the public telephone, causes the display section 11 to display the push dial, and causes the telephone circuit 28 to call according to the operation to the displayed push dial.

After the line is connected, the computer causes the telephone circuit 28 to execute a normal telephone call operation, so that the public terminal functions as the public telephone.

Besides, in order to cope with coin insertion payment, the public terminal 1 is provided with a coin processing section 30, which executes charge collection processing and return processing of change to the coin inserted through the coin insertion section 15.

A prepaid card processing section 31 executes charge collection processing with a prepaid card inserted through the prepaid card insertion section 16. For example, it executes processing of update of magnetic data of the prepaid card, punching, and the like according to the charge to be collected.

When the public terminal 1 is used as the computer terminal, and in the case where payment by a coin or prepaid card is executed, the computer 20 transmits the information of the payment to the public telephone management company 6 through the telephone line 8.

The credit card processing section 32 reads information of a credit card inserted through the credit card insertion section 17, and supplies it to the computer 20. In this case, the computer 20 transmits the credit card information (card number) and information of use fees to the credit card company 3 through the telephone line 8.

In the case where the user makes payment by credit card registration, that is, in the case where a credit card or the like is not inserted in the public terminal 1, the processing at the coin processing section 30, the prepaid card processing section 31, and the credit card processing section 32 is not carried out.

In that case, high level identification processing through, for example, communication with the public terminal management company 2 is executed by using the media ID and the user ID recorded in the disk 90, the user ID and the personal identification number inputted by the user, and the like. If the identification result is OK, the user can use the public terminal 1, and accounting of use fees and the like is made to the user as paperwork to the public terminal management company 2, the credit card company 3, and the like.

Although the public terminal 1 is, for example, constructed as described above, all of the structural elements are not always necessary, and a structural element not illustrated maybe provided. For example, in a type of unit which does not deal with insertion payment of a credit card, the credit card insertion section 17 and the credit card processing section 32 are not necessary.

As an example in which other structural elements are added, it is conceivable that a printer section is disposed and print output is made possible at the use of the public terminal 1. Of course, a printer unit as a separate body from the public terminal 1 may be connected and disposed.

Such an example is also conceivable that a CD-ROM drive is provided.

Besides, a power amplifier and a speaker unit may be provided so that the user can listen to music or the like as contents at that place.

Further, in the case where the use of the public terminal 1 is made free of charge, the coin insertion section 15, the coin processing section 30, the prepaid card insertion section 16, the prepaid card processing section 31, the credit card insertion section 17, and the credit card processing section 32 naturally become unnecessary.

4. Type of Backup Operation System

Next, backup operation systems as types of backup operation carried out in this embodiment will be described.

In this embodiment, it is designed such that as shown in FIG. 9, five backup operation systems of backup levels LV1 to LV5 can be selectively carried out.

The operation content and backup capacity of each of the backup operation systems become as follows:

In the backup level LV1, the backup operation is not carried out. Of course, in the case where this backup level LV1 is selected, there is a high possibility that the data under operations are lost in such a case that hang-up of the public terminal 1 occurs.

In the backup level LV2, at the time when the user carries out editing/preparation at the public terminal 1, such an operation is made that backup data of the data under operations are automatically and periodically (every fixed time) saved. The storing place in this case is made the HDD 21 in the public terminal 1.

In the case where this backup level LV2 is selected, since the data under operations are periodically saved, for example, even if the system is reset in the case where hang-up of the public terminal 1 occurs, it is possible to make data loss minimum.

In the backup level LV3, similarly to the backup level LV2, at the time when the user carries out editing/preparation at the public terminal 1, backup data of the data under operations are automatically and periodically (every fixed time) saved, and further, the data file before update (before operations) is also automatically saved. For example, in the case where such operations are carried out that a data file is read from the disk 90 and the content of the file is edited, the data file at the time point when it is read out is also saved for backup. The storing place in this case is made the HDD 21 in the public terminal 1.

In the case where the backup level LV3 is selected, since the data under operations are periodically saved as in the case of the backup level LV2, even in the case where hang-up of the public terminal 1 occurs, data loss can be made minimum. Further, measures can be taken even in the case where setting of a new file name is forgotten when a file edited by the user is saved.

For example, in the case where the user reads a file from the disk 90 and edits the file to prepare a new file, let us imagine that the edited file has been recorded in the disk 90 erroneously as the file name of the read file without change. In this case, the original file is overwritten and is deleted. However, by the operation of the backup level LV3, since the data of the original file are saved, the user can read out the backup file and record it in the disk 90. Like this, even if the user makes a mistake in the storing operation, the lost file can be revived.

At the backup level LV4, at the time when the user carries out editing/preparation with the public terminal 1, such operation is executed that all of key inputs under operations are automatically saved as backup data. The storing place is made the backup section 2b of the public terminal management company 2 in addition to the HDD 21 in the public terminal 1. That is, all of the key inputs are recorded in the HDD 21 at all times, and are transmitted to the public terminal management company 2 to be saved in the backup section 2b.

In the case where this backup level LV4 is selected, since information of all the key inputs is saved for backup, even in the case where hang-up of the public terminal 1 occurs and reset is carried out, all of the file state just before the hang-up can be reproduced. That is, there is no data loss. Further, even in the case where the user notices an error in the user's operations under the processing of edit operation or the like, it becomes possible to return to file contents at a desired stage.

Further, in addition to the hang-up, even in the case where the HDD 21 is crushed, or the public terminal 1 itself is put into such a state as malfunction or complete shutdown, files before the operations such as editing or under the operations can be reproduced from the data saved at the side of the backup section 2b.

Of course, even if there is a storing mistake of the user to the disk 90 as set forth above, it is also possible to revive the lost file.

At the backup level LV5, in addition to the operation of the backup level LV4, a final file after the operations is transmitted to the public terminal management company 2 and is saved in the backup section 2b for a predetermined period.

In the case where this backup level LV5 is selected, similarly to the case of the backup level LV4, high level backup capacity is provided, and the final file (file prepared by the user in the edit operation or the like) is saved at the side of the public terminal management company 2, so that the user can access the final file at a later time and at an arbitrary place.

For example, a file prepared by using some public terminal can be accessed by another public terminal at a later time to be confirmed or to be saved in the disk 90. Moreover, even in a place where there is no public terminal 1 as in a foreign country, it becomes possible to access the public terminal management company 2 by using a personal computer existing there and to read the saved file.

In the case where the final file is saved for backup at the side of the public terminal management company 2 at the backup level LV5, the storage period is also set. For example, it is designed such that when the user selects the backup level LV5, the storage period can be also selected, and the final file is saved in the backup section 2b of the public terminal management company 2 for only the period.

At the backup levels LV4 and LV5, with respect to the data of input keys as well, it is possible to design such that the user can set the storage period at the backup section 26. However, it is assumed that this is fixed at a definite period.

In this embodiment, the backup level ID recorded in the disk 90 is the identification information indicating any one of the backup levels LV1 to LV5. The identification information may contain information of a storage period of a final file at the backup level 5.

Incidentally, use fees of the public terminal may be added according to the backup capacity of each of the backup systems.

5. Use Procedure

Figure 10:
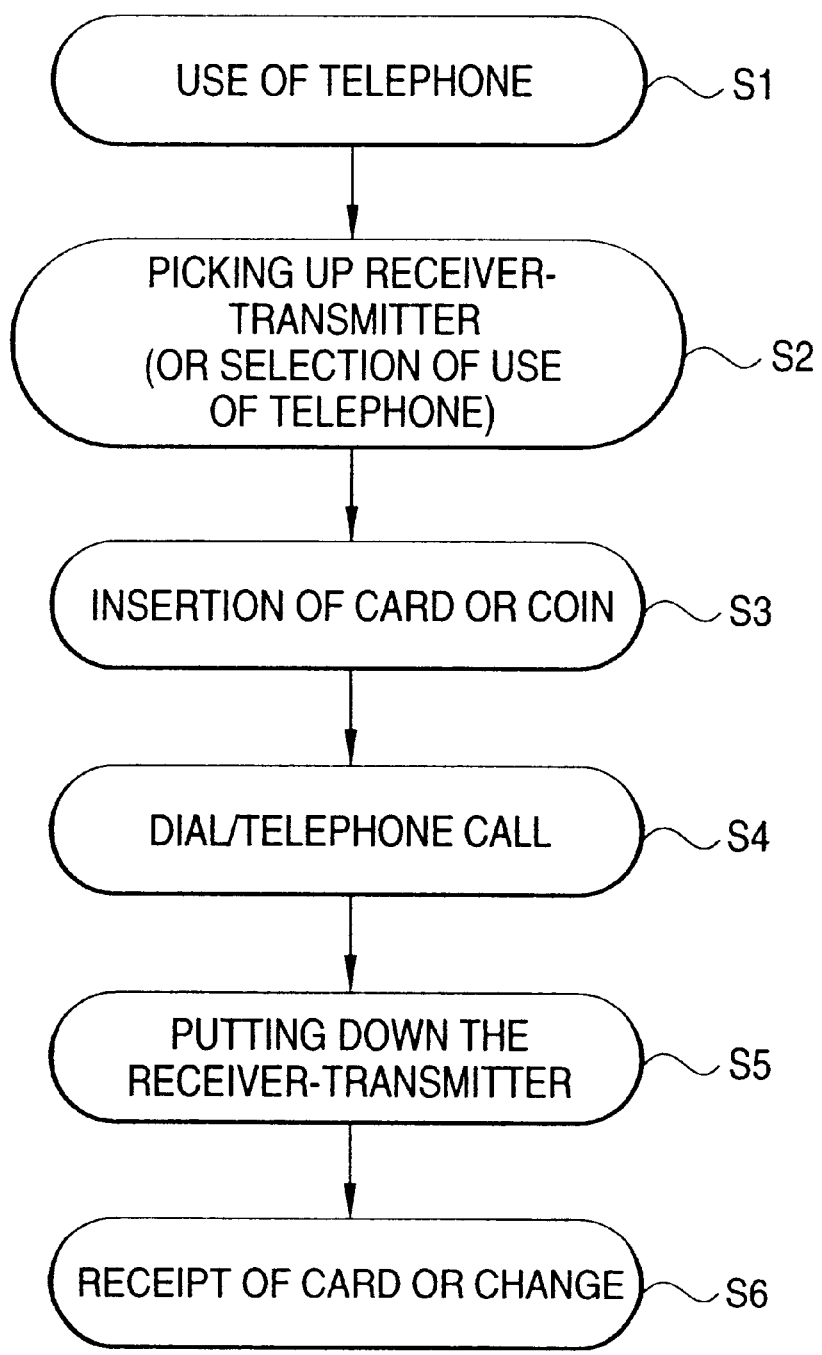
FIG. 10 is an explanatory view of a use procedure of a user to a public terminal of an embodiment.

A use procedure of a user to the public terminal 1 in this embodiment will be described. First, FIG. 10 shows the procedure of the case where the public terminal 1 is used as a public telephone.

In the case where the public terminal is used as the telephone (S1), the user first picks up the receiver-transmitter 18 (S2). Although the processing of the computer 20 of the public terminal 1 will be described later in detail, in the case where the receiver-transmitter 18 is picked up, the computer 20 judges that the user has an object to use the public terminal as a telephone, and proceeds to a process corresponding to that. For example, a push dial is displayed on the display section 11.

As the procedure of the user, he or she subsequently makes fee insertion (S3). That is, the user inserts a coin, prepaid card, or credit card.

Then the user performs a dial operation to the push dial displayed on the display section 11, and makes a telephone call when the line is connected (S4).

When the telephone call is ended, the user puts the receiver-transmitter 18 on the hook (S5). The computer 20 detects the end of the telephone call by that, and makes accounting processing to return the prepaid card or change. The user receives the card or change (S6), and ends the use.

Next, the procedure in the case where the user uses the public terminal 1 as a computer terminal will be shown in FIG. 11.

In the case where the public terminal is used as the computer terminal (S10), the user can select a use mode of using a disk, the user's own disk 90 in which a backup level ID is recorded, a use mode of using a disk, the user's own disk 90 in which a backup level ID is not recorded, or a use mode of not using the disk 90.

First, the procedure of the case where the disk 90 is not used is as follows:

The user first selects the use as the computer terminal from the initial screen displayed on the display section 11 of the public terminal 1 (S11).

Then the public terminal 1 (the computer 20) enters into a processing mode as the computer use.

Next, the user performs an operation of selecting a backup level according to the display screen (S12). That is, a screen on which the backup levels LV1 to LV5 described with reference to FIG. 9 can be selected is displayed, and the user selects a desired backup level among them.

The user subsequently inserts a coin, prepaid card, or credit card as the fee insertion processing. In the case where the user selects the payment by registration of a credit card, he or she inputs the user ID or the like for the identification processing (S13). In the case where the use through the credit card registration payment is made impermissible when the disk 90 is not used, the input procedure of the user ID or the like for the identification processing becomes unnecessary.

Subsequently, the user selects a function in accordance with the display on the display section 11 (S14). In this embodiment, it is designed such that information retrieval using the public terminal 1 and upload of data can be made in the case where the disk 90 is not used. Of course, functions other than these may be made executable.

In the case where information retrieval is to be executed, the user selects the information retrieval in the function selecting procedure, and carries out an actual information retrieval operation (S24). For example, it is possible to make retrieval from the network 7, and in the case where a data base is formed in the inside HDD 21, it is possible to make information retrieval from the data base. The user can confirm the retrieval result on the display section 11.

In the case where upload is to be executed, the user selects the upload in the function selecting procedure, and performs an actual operation for the upload (S21). For example, the user prepares a document at the public terminal 1, and can upload the document as an electronic mail to the system through the public terminal 1 or the network 7 (the upload processing in this embodiment includes preparation/editing of a file, an electronic mail, and the like to be uploaded).

Incidentally, when the file for the upload is prepared, the backup operation selected at the foregoing procedure S13 is executed.

When these necessary processings are ended, the user performs an end operation, and receives the prepaid card inserted for charge payment (receives change in the case of the coin) (S25) and ends the use.

In the case where the disk with the backup level ID is used, the user loads the disk 90 from the disk tray 14 to the public terminal 1 (S15). Then the computer 20 judges that the user has an object to use the public terminal as a computer terminal, and enters into a processing mode as the computer use. Incidentally, it is also possible to modify such that the user performs an operation to select the use as the computer terminal from the initial screen displayed on the display section 11, and thereafter, loads the public terminal with the disk 90.

As the fee insertion processing, the user inserts a coin, prepaid card, or credit card. In the case where payment by registration of a credit card is to be carried out, the user inputs the user ID or the like for identification processing (S16).

Subsequently, the user selects a function in accordance with the display on the display section 11 (S17). In this embodiment, it is designed such that edit, information retrieval, upload, and download, which use the public terminal 1, can be executed in the case where the disk is used.

In the case where the edit is to be executed, the user selects the edit in the function selecting procedure, and performs an actual edit operation (S22).

As the edit, it is possible to execute such processing that the user accesses the data recorded in the disk 90, such as a document file, to edit it and saves the edited data in the disk 90, such processing that the user newly prepares a document file etc. to save it in the disk 90, and so on.

In such edit processing, while the file preparation/editing is executed, the backup operation at the backup level indicated by the backup level ID recorded in the disk 90 is carried out.

In the case where information retrieval is to be carried out, the user selects the information retrieval in the function selecting procedure, and performs an actual information retrieval operation (S24). In this case, similarly to the foregoing case where the disk 90 is not used, for example, retrieval from the network 7 or information retrieval from the database formed in the inside HDD 21 can be made, and the user can confirm the retrieval result on the display section 11.

In the case where upload is to be executed, the user selects the upload in the function selecting procedure, and performs an actual operation for the upload (S21).

In this case, an object to be uploaded is a data file (various files such as a document, music contents, video contents) previously saved in the disk 90, or a data file edited with the forgoing edit function or newly prepared. These can be uploaded.

For example, a document file as an electronic mail can be uploaded to the system through the public terminal 1 or the network 7, or music or the like composed by the user as music contents can be provided to the network 7.

In the upload processing, while the file preparation/editing is executed, the backup operation at the backup level indicated by the backup level ID recorded in the disk 90 is carried out.

In the case where download is to be carried out, the user selects the download in the function selecting procedure, and performs an actual operation for the download (S23).

In this case, as an object to be downloaded, the user can select necessary information (file, contents, application, etc.) in the public terminal 1 or from the network 7, and can download arbitrary information into the user's own disk 90 by specifying the download object.

After these necessary processings are ended, the user performs an end operation, receives the prepaid card inserted for charge payment (receives change in the case of the coin) as the need arises (S25), and ends the use. In the case of payment by credit card registration, it is also acceptable to design such that the user receives a receipt indicating charged fees.

In the case where the user uses a disk in which the backup level ID is not recorded, the user first loads the disk 90 from the disk tray 14 to the public terminal 1 (S18). Then the computer 20 judges that the user has an object to use the public terminal as a computer terminal, and enters into a processing mode as the computer use.

Next, the user performs an operation to select a backup level according to a display screen (S19). That is, the screen on which the backup levels LV1 to LV5 described with reference to FIG. 9 can be selected is displayed, and the user selects a desired backup level among them.

The user subsequently inserts a coin, prepaid card, or credit card as the fee insertion processing. In the case where the user selects payment by registration of a credit card, he or she inputs the user ID or the like for identification processing (S20).

Subsequently, the user selects a function in accordance with the display on the display section 11 (S17). The following processing is the same as the case where the disk with the backup level ID is loaded.

However, in the processing of the edit (S22) or upload (S21), and in the case where the user performs file preparation/editing and the like, the backup operation corresponding to the backup level selected at the procedure S19 is carried out.

The user can use the public terminal 1 as the telephone or the computer terminal in, for example, the foregoing procedure of FIGS. 10 and 11.

6. Processing of Public Terminal

The processing of the computer 20 of the public terminal 1 for realizing the use in the foregoing procedure and for executing various processings according to the request by the user, including the desired backup operation, will be described with reference to the flowcharts of FIGS. 18 to 22. Besides, examples of display screens on the display section 11 at the respective processings will be described with reference to FIGS. 12 to 15 and FIG. 20.

The public terminal 1 is on standby at a set place in a state where an initial screen is displayed on the display section 11 at step F101.

Figures 12A, 12B:
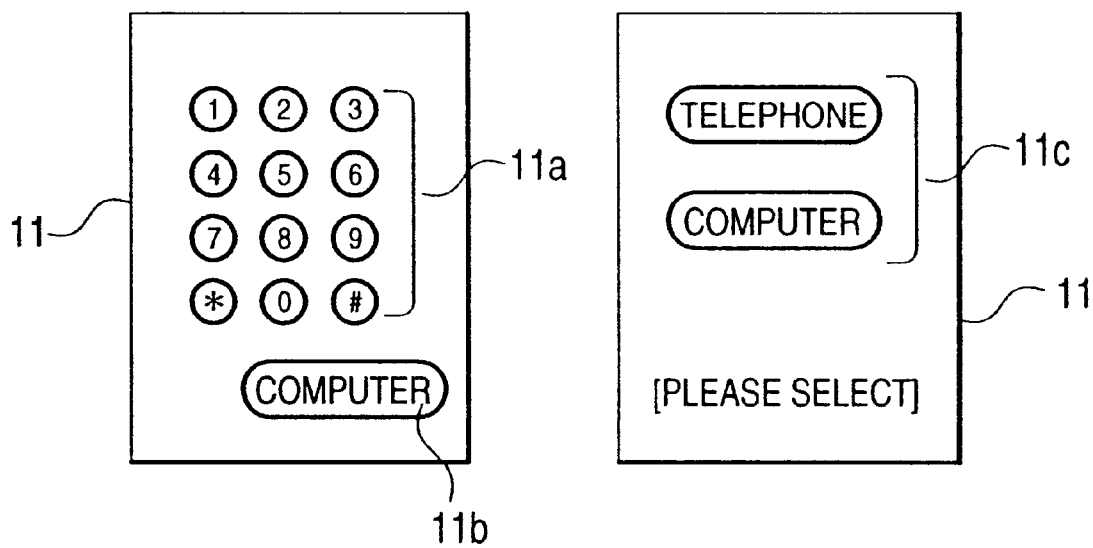
FIGS. 12A and 12B are explanatory views of examples of an initial screen of a public terminal of an embodiment.
Figure 13:
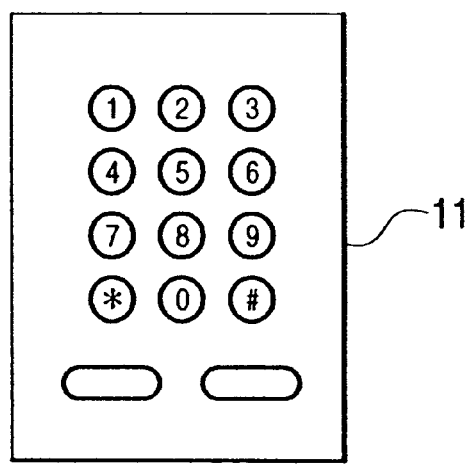
FIG. 13 is an explanatory view of an example of a screen for a telephone in a public terminal of an embodiment.

An example of the initial screen is shown in FIGS. 12A and 12B. FIG. 12A shows an example in which, for the purpose of making the user recognize that the public terminal can be used as a public telephone, a push dial display 11a is shown, and for the purpose of making the user recognize that the public terminal can be used as a computer terminal, a computer use select display 11b is shown.

FIG. 12B shows an example in which a use select display 11c for facilitating selection of telephone use or computer use is shown, so that the user recognizes that these use modes can be selected. Of course, various examples for the initial screen are conceivable other than these.

The computer 20 executes monitoring processing at steps F102, F103, and F104 in the state where such an initial screen is displayed at step F101.

In the case where the computer 20 judges that the user has an object to use a telephone, the computer proceeds from step F102 to step F105. That the user has an object to use a telephone is judged by detection of picking up of the receiver-transmitter 18 or by detection of the user's operation of selecting the telephone to the initial screen as shown in FIG. 12B.

In the case where the computer 20 judges the object to be the telephone use, the computer causes the display section 11 to display an image for a telephone at step F105. The computer 20 causes a push dial to be displayed as in an example of FIG. 13. In the case where the initial screen is made a screen as shown in FIG. 12A, the screen may be used as it is.

Subsequently, as the fee insertion processing at step F106, the computer 20 monitors the fee insertion dealing processing of the coin processing section 30, the prepaid card processing section 31, or the credit card processing section 32, and confirms that the user performs the fee insertion as the procedure S3 in FIG. 10.

After confirming the fee insertion, the computer 20 proceeds to the actual telephone call processing at step F107.

That is, the computer 20 causes the telephone circuit 28 to make dial calling in accordance with the dialing operation of the user to the displayed push dial, and when the line is connected, the computer causes the telephone circuit 28 to execute a telephone call.

When the user ends the telephone call, he or she hangs the receiver-transmitter 18 on the hook. When it is detected that the receiver-transmitter 18 is put like that, the computer 20 proceeds from step F108 to F109, and makes processing corresponding to the telephone call fee. That is, the computer 20 causes the accounting processing by the coin processing section 30, the prepaid card processing section 31, or the credit card processing section 32 to be executed, and causes the return processing of the card or change to be executed as the need arises.

The operation as the telephone device is ended here, and the computer returns to step F101.

In the case where the public terminal 1 is used as the computer terminal, as described above, as the use procedure of the user, there are a case where the disk 90 is loaded and a case where the disk is not loaded.

In the case where the disk 90 is not used, the user selects the computer use from the initial screen as shown in FIG. 12A or 12B.

Figure 17:
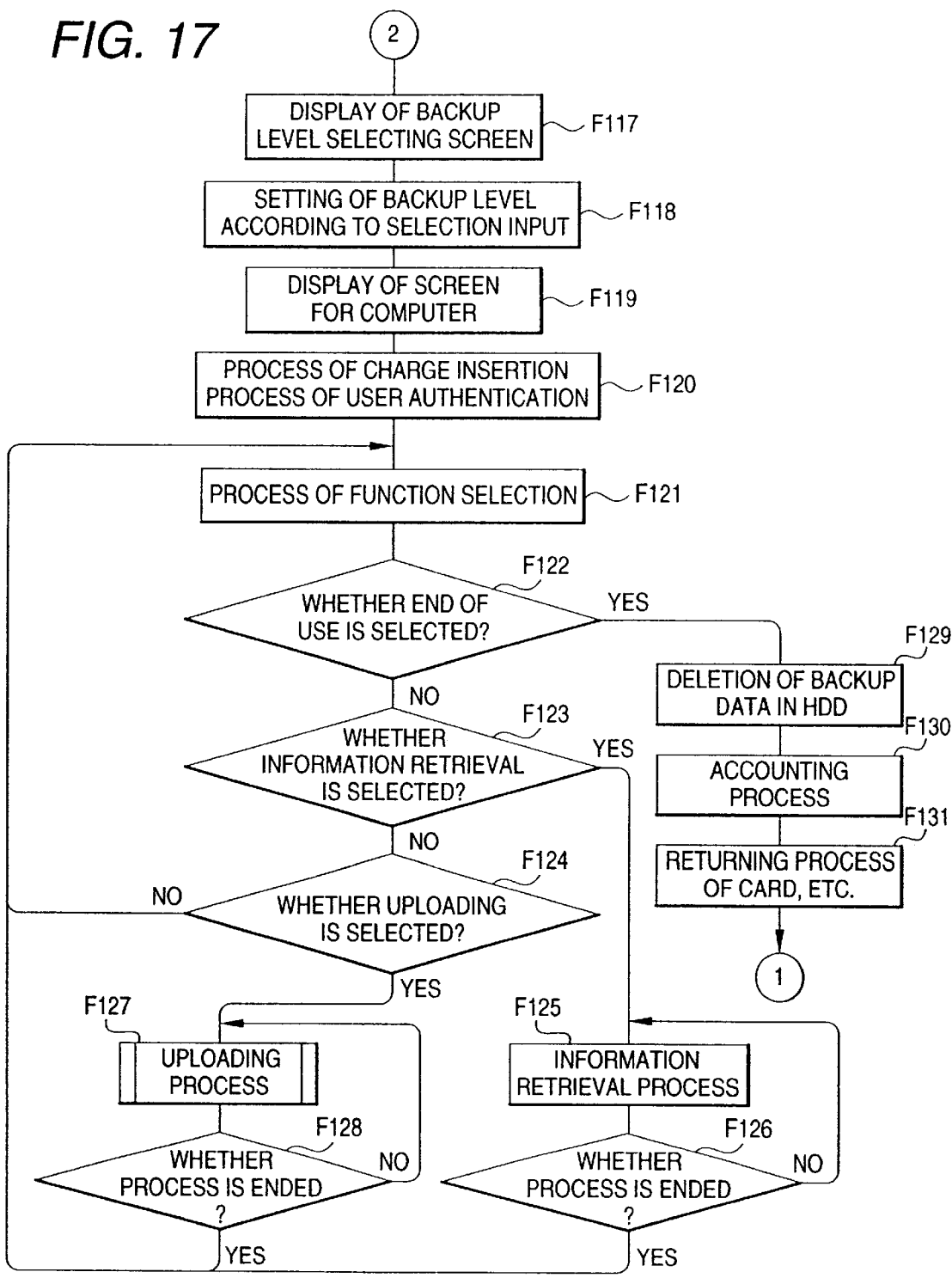
FIG. 17 is a flowchart of a processing of a public terminal of an embodiment.
Figure 18:
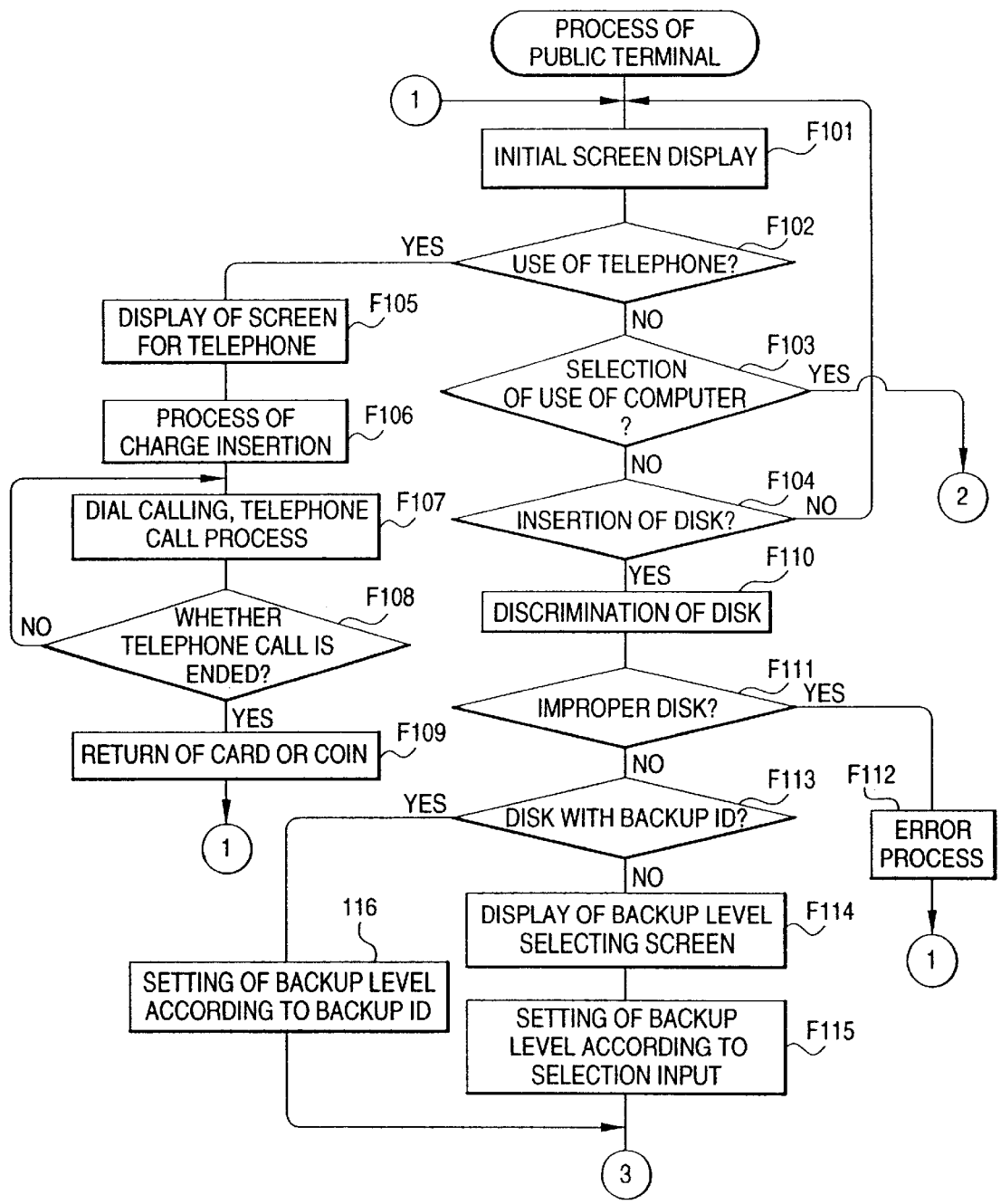
FIG. 18 is a flowchart of a processing of a public terminal of an embodiment.

In the case where such selecting operation is detected, the processing of the computer 20 proceeds from step F103 of FIG. 18 to step F117 of FIG. 17 as shown by in the drawings.

First, at step F117, the computer 20 causes the display section 11 to make display for backup level selection.

An example of a backup level selecting screen in this case is shown in FIG. 14C.

That is, the backup operation contents of the backup levels LV1 to LV5 of FIG. 9 are displayed on the screen so that the user can select one by a touch operation.

However, as in this case, when the disk 90 is not used, the backup level LV3 is made impossible to be selected. That is, since the backup level LV3 is such an operation that backup of file data before update, that is, file data read out from the disk 90 is made in addition to the operation of the backup level LV2, in the case where the disk 90 is not used, it can not be applied. Thus, as shown in FIG. 14C, with respect to the backup level LV3, display is made in the non-active state (of course, it does not matter if the level LV3 is not displayed).

The user makes selection by touching any one of display sections of the backup levels LV1, LV2, LV4 and LV5, and the computer 20 sets the backup level selected in the processing at step F118 as the backup operation to be executed.

In the case where the backup level LV5 is selected, a storage period of a final file in the public terminal management company 2 is set. Although not specified in the flowchart of FIG. 17, as processing in step F118, in the case where the backup level LV5 is selected, for example, the screen for setting the storage period as shown in FIG. 14B is displayed for setting of the storage period.

That is, keys necessary for the operation, such as a ten-key, a cursor moving key, a decision key, and a cancellation key are displayed, so that the user inputs the storage period (date) in the server (public terminal management company 2). The computer 20 sets the information of the storage period in response to the input.

Incidentally, as the selection of the storage period, it is also possible to design such that specific periods, for example, one week, two weeks, one month, three months, one year, and the like, are prepared so that the user selects one among them (the same applies to the case of step F115 described later).

When the backup level is set, the computer 20 proceeds to step F119 and causes the display section 11 to display a screen for a computer.

Figure 15:
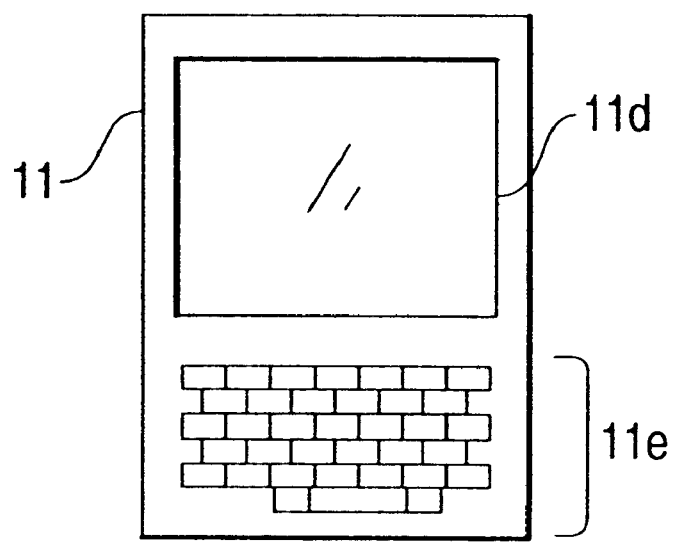
FIG. 15 is an explanatory view of an example of a screen for a computer in a public terminal of an embodiment.

An example of the screen for the computer is shown in FIG. 15. For example, as in this example, the display region of the display section 11 is divided into upper and lower sections, and the upper section is made a so-called monitor display 11d and the lower section is made a keyboard display 11e.

The monitor display 11d is used for display of a monitor image as a computer terminal, and the computer 20 causes, for example, a menu image, a text or an image of a file itself to be processed, and various icons to be displayed according to the progress of the processing.

On the other hand, the keyboard image 11e is made an image similar to a keyboard in a normal computer device, and this image is supplied to the user for a keyboard operation. That is, when the user touches each key of the keyboard display 11e, input of characters and commands can be made similarly to a normal keyboard.

Subsequently, the computer 20 executes processing as to fee insertion, for example, confirmation of insertion of a coin, prepaid card, credit card, or the like, and the corresponding processing at step F120. In the case where payment by registration of a credit card is made possible and the user selects that, the computer 20 executes, for example, an input request of a user ID or personal identification number, an input processing, a check processing, and the like, as a necessary user authentication processing.

When the processing as to the fee insertion is ended, the computer 20 executes the function select processing at step F121. For example, the computer causes the monitor display 11d at the display section 11 to show a function menu and urges the user to select.

Since this case is the use as the computer terminal in the case where the disk 90 is not loaded, the computer 20 prepares, for example, three options of information retrieval, upload, and end of use, as the option of functions.

At steps F122, F123, and F124, the computer 20 waits for selection of the user.

In the case where the user selects the information retrieval, the computer 20 proceeds from step F123 to F125, and proceeds to the actual information retrieval processing. That is, the computer 20 proceeds with the required processing in response to the touch operation of the user to the icon display, menu display, and the like on the keyboard display 11e and the monitor display 11d at the display section 11, and executes the retrieval processing of information required by the user. The computer 20 executes also the communication processing through the network 7 for retrieval as the need arises. Then the computer 20 causes the monitor display section lid to show information as the retrieval result, actually retrieved information, and the like.

When the retrieval processing is ended, the computer returns from step F126 to step F121.

In the case where the user selects the upload, the computer 20 proceeds from step F124 to F127, and proceeds to the upload processing. That is, in response to the touch operation of the user to the icon display, menu display, and the like on the keyboard display 11e and the monitor display 11d at the display section 11, the computer 20 executes the processing for document preparation by the user and the upload of the prepared document, etc. The destination of upload is the HDD 21 or a predetermined system or terminal through the network 7.

In the upload processing, although the user prepares the data file to be uploaded in the public terminal 1, at this time, the backup operation set at the foregoing step F118 is executed.

Figure 16:
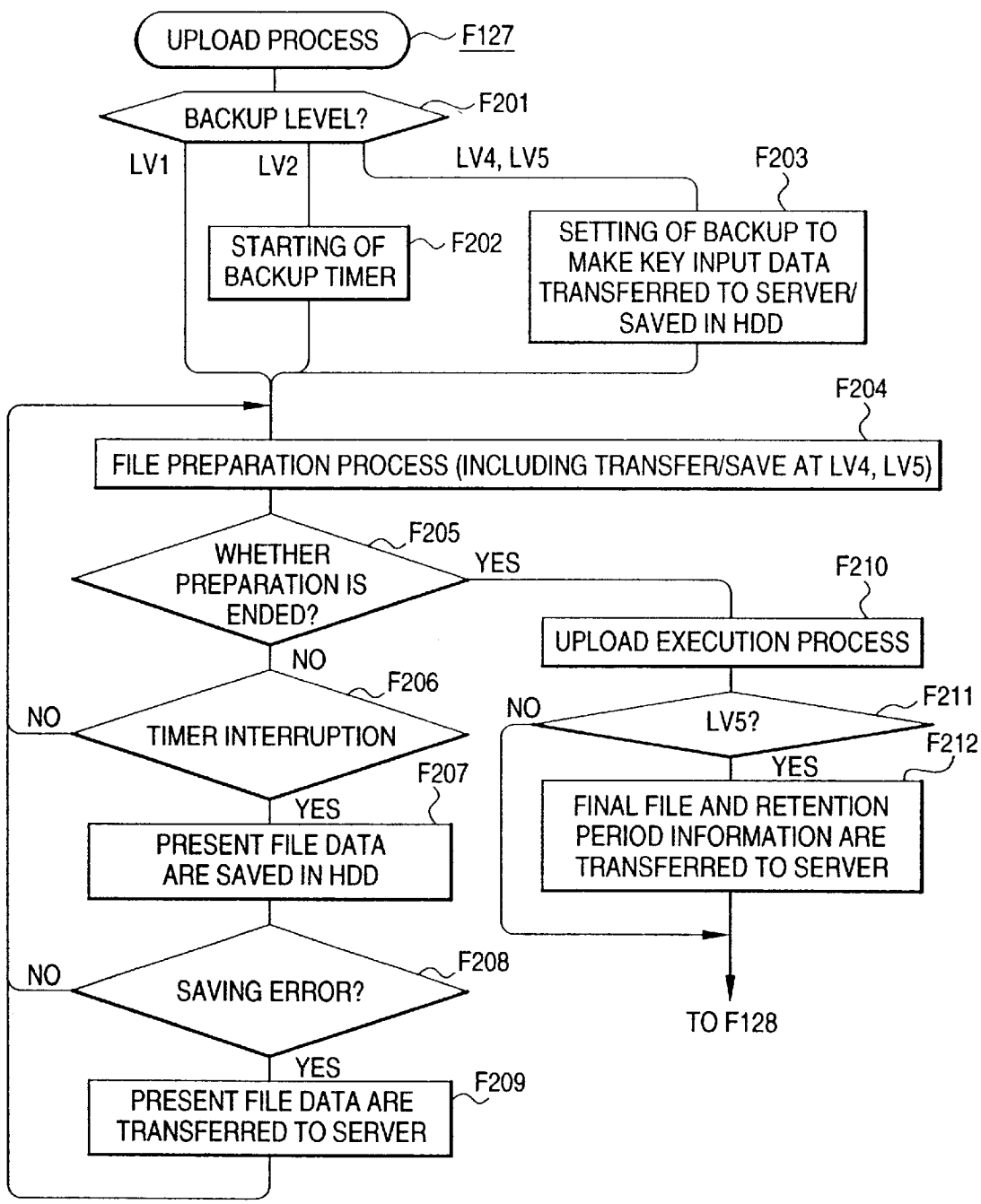
FIG. 16 is a flowchart of a processing of a public terminal of an embodiment.

Processing for this in step F127 is shown in detail as steps F201 to 212 of FIG. 16.

First, when the upload processing is started, the computer 20 makes the processing branch off at step F201 according to the backup level set at step F201 (that is, set in accordance with the selecting operation at step F118).

When the backup level LV1 is set, since the backup operation is not executed, the computer 20 proceeds to step F204 directly.

When the backup level LV2 is set, the computer 20 starts a backup timer to execute the periodic backup operation at step F202, and proceeds to step F204.

When the backup level LV4 or LV5 is set, the computer 20 executes the operation setting to transmit all key inputs to the server (public terminal management company 2) and to save them in the HDD 21 at step F203, and proceeds to step F204.

As described above, the backup level LV3 is not set in this case.

The computer 20 executes present file preparation processing at step F204. That is, the computer prepares file data such as a document in response to the input of the user.

Moreover, in the case where the backup operation of the backup level LV4 or LV5 is set at step F203, the computer 20 saves all of the key input data under the file preparation processing at step F204 in the HDD 21 at all times, and further, transmits them to the backup section 2b of the public terminal management company 2 through the network 7. The backup section 2b stores the transmitted data for backup in response to the transmission.

Under the file preparation processing, only in the case where the backup timer is started at step F202 (that is, only in the case where the backup level LV2 is set), interruption processing occurs every predetermined time interval on the basis of the backup timer.

In that case, the computer 20 proceeds from step F206 to F207, and executes the processing of saving the file data under preparation at the point of time into the HDD 21. Then the computer returns from step F208 to F204, and proceeds with the file preparation processing.

According to circumstances, there is also a case where a data writing error to the HDD 21 occurs. In that case, the computer 20 proceeds from step F208 to F209, transmits the file data to be saved to the public terminal management company 2, and has the data saved in the backup section 2b. That is, even in the case where some disadvantage occurs in the HDD 21, at least the backup data are saved in the backup section 2b, so that the certainty and reliability of the backup operation are secured.

When the file preparation processing is ended, the user subsequently performs an operation to cause the file data to be uploaded, and in that case, the computer 20 proceeds from step F205 to F210, and executes the upload operation control according to the instruction of the user.

In the case where the backup level LV5 is set, the computer 20 proceeds from step F211 to F212, transmits the final file, that is, the uploaded file data to the public terminal management company 2, and has the data saved in the backup section 2b. At this time, the computer simultaneously transmits also the storage period information, which was set by the user's input to the display as shown in FIG. 14B, to indicate the storage period at the backup section 2b. The backup section 2b stores the final file only for the period specified by the storage period information. With respect to the key input information in the case of the backup level LV4 and LV5, the backup section 2b stores, for example, only for a fixed period.

After the above processing is ended, the computer 20 proceeds to step F128 of FIG. 17.

When it is judged that the upload processing is ended, the computer 20 returns to step F121.

In the case where the use as the computer terminal is ended, the user selects the use end from the function selecting menu screen at step F121. When detecting the operation, the computer 20 proceeds from step F122 to F129, and first, at the point of time, executes processing to delete the backup data saved in the HDD 21 for this use. In the case other than the backup level LV1, and in the case where an actual backup operation is executed, some backup data are save in the HDD 21 at the point of time when the use is ended. Since anyone can use the public terminal 1, it can not be said that the security is high for the HDD 21 in the public terminal 1. Thus, it is not preferable to leave data prepared (under preparation) by the user in the HDD 21 since there can be a leak of personal information. Thus, at the end of the use, the backup data in the HDD 21 are deleted.

Subsequently, the computer 20 executes the accounting processing at step F130. That is, the computer causes the accounting processing by the coin processing section 30, the prepaid card processing section 31, or the credit card processing section 32 to be executed. Alternatively, in the case of payment by the credit card registration, the computer transmits the accounting information to the public terminal management company 2.

The amount of money to be charged to the user is set according to the use time and the processing content of the public terminal 1. A charge may be added according to the backup level of the executed backup operation. For example, the charge is added as a backup service fee such that when the backup level LV1 is set, there is no charge, when LV2 is set, 300 yen . . . when LV5 is set, 1000 yen. However, it is also conceivable that the backup service is made free of charge.

After the accounting processing is ended, at step F131, the computer causes the return processing of the card or change to be executed as the need arises.

Here, the computer 20 ends the operation as the computer terminal in the case where the disk 90 is not used, and returns to step F101 of FIG. 18.

In the case where the user uses the disk 90 and uses the public terminal 1 as the computer terminal, as described above, as the use procedure of the user, the user first loads the disk 90. That is, when the user operates the eject key 13 to load the disk 90, the computer 20 ejects the disk tray 14. When the user puts the disk 90 on the disk tray 14 and again presses the eject key 13 (or pushes the disk tray 14), the computer 20 causes the disk tray 14 to be housed, whereby the recording and reproducing of the disk 90 is enabled by the disk drive 24.

In the case where such insertion operation of the disk 90 is detected, the computer 20 proceeds from step F104 of FIG. 18 to step F110.

At step F110, the computer 20 instructs the disk drive 24 to read the identification code for the public terminal in the disk 90, and confirms the identification code. That is, the computer confirms whether the inserted disk is a disk suitable for the use of this public terminal 1.

If the computer 20 judges that the disk does not correspond to the public terminal 1 since the identification code can not be suitably read, the computer proceeds from step F111 to F112, and instructs the tray driving section 22 to eject the disk tray 14, so that the disk is ejected and the processing is ended. That is, the computer returns to step F101.

In the case where the identification code is suitably confirmed, the computer 20 proceeds from step F111 to F113, and judges whether the backup ID is recorded in the disk 90. Incidentally, it is satisfactory if the reading of the backup ID from the disk 90 is simultaneously executed in the reading operation at step F110.

At step F113, the computer causes the process to branch off according to the existence of the backup ID.

In the case of the disk in which the backup ID is recorded, at step F116, the computer sets the backup level indicated by the backup ID (one of LV1 to LV5). In the case where the backup level LV5 is indicated as the backup ID, the storage period information is also recorded, and the computer 20 reads the storage period information.

On the other hand, in the case of the disk in which the backup ID is not recorded, at step F114, the computer 20 causes the display section 11 to make display for backup level selection. An example of the backup level selecting screen in this case is shown in FIG. 14A.

That is, it is designed such that the computer 20 causes the backup operation contents of the backup levels LV1 to LV5 to be shown on the screen, so that the user can select through a touch operation.

To such display, the user touches any one display section of the backup levels LV1, LV2, LV3, LV4, and LV5 to make selection, and the computer 20 sets the backup level selected in the processing at step F115 as the backup operation to be executed.

In the case where the backup level LV5 is selected, in order to make the user select the storage period of the final file in the public terminal management company 2, the computer causes, as the processing in step F115, a screen for setting the storage period to be displayed as in FIG. 14B.

That is, the computer 20 causes keys necessary for the operation, such as a ten-key, a cursor moving key, a decision key, and a cancellation key to be shown, and urges the user to input the storage period (date) at the server (public terminal management company 2). According to the input by the user, the computer 20 sets the storage period information.

Figure 19:
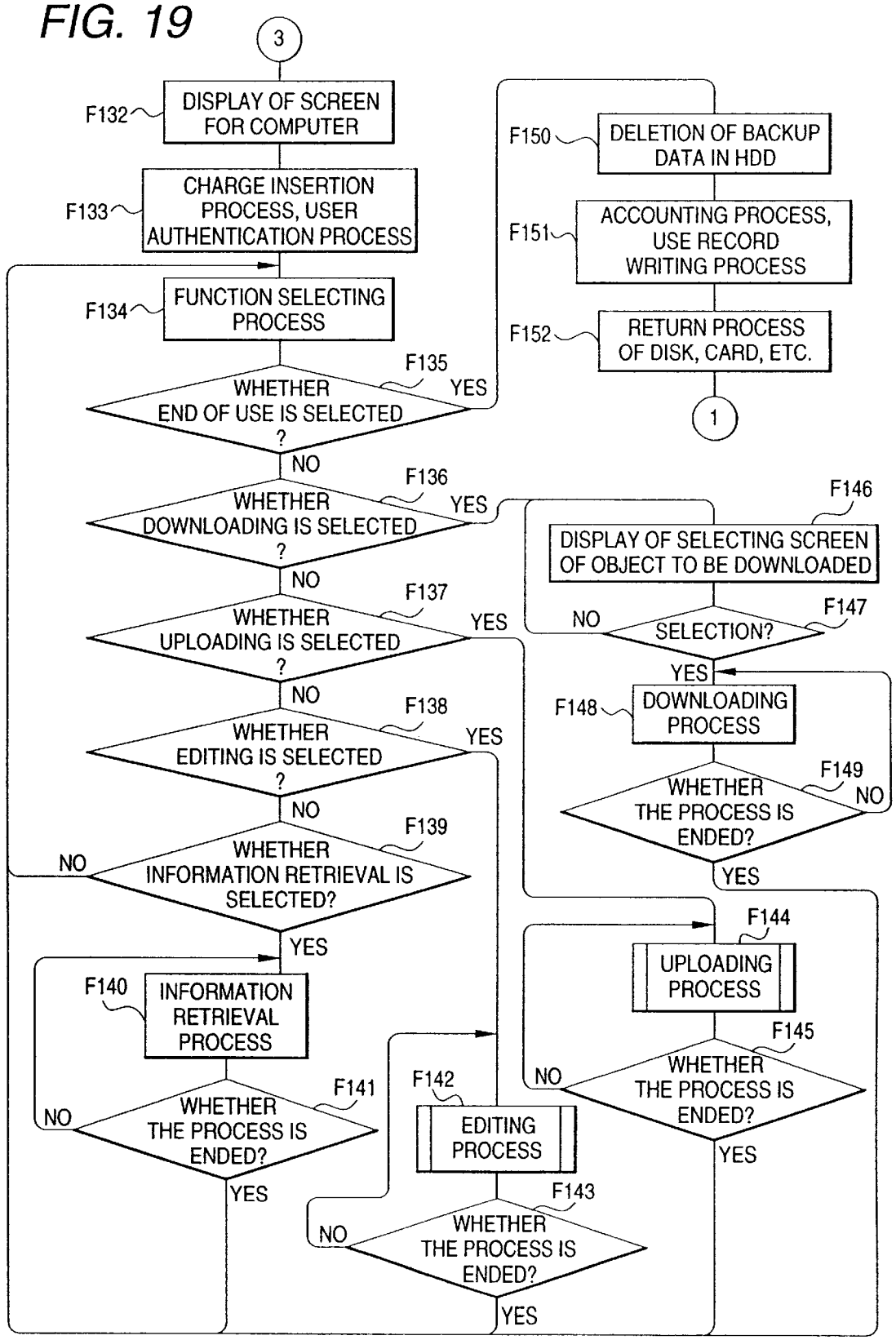
FIG. 19 is a flowchart of a processing of a public terminal of an embodiment.

After the processing at step F116 or F115 is ended, as shown by in the drawing, the computer 20 proceeds to step F132 of FIG. 19.

At step F132, the computer 20 causes the display section 11 to display a screen for a computer. That is, similarly to the case of the foregoing step F119, the computer 20 provides a display as shown in FIG. 15 to make such a state that the user can perform various operations for information processing and confirm a processing screen.

Subsequently, at step F133, the computer 20 executes the processing as to fee insertion, for example, executes confirmation of insertion of a coin, prepaid card, credit card, or the like and the corresponding processing. In the case where payment by registration of a credit card is executed, the computer 20 executes, as a necessary user authentication processing, for example, an input request of a user ID or personal identification number, an input processing, a check processing, and the like. The computer 20 can judge by, for example, confirming the content of the payment registration information (see FIG. 4) of the disk 90 that the credit card registration payment is to be executed.

After the processing as to the fee insertion is ended, the computer 20 executes the function selecting processing at step F134. For example, the computer 20 causes the monitor display 11d at the display section 11 to display the function menu and urges the user to select.

In this case, since the public terminal is used as the computer terminal in the case where the disk is loaded, the computer 20 prepares, as options of functions, for example, five options of edit, information retrieval, upload, download, and end of use.

At steps F135, F136, F137, F138, and F139, the computer waits for selection by the user.

In the case where the user selects the information retrieval, the computer 20 proceeds from step F139 to F140, and proceeds to an actual information retrieval processing. That is, the computer 20 proceeds with a required processing in response to the touch operations of the user to the key board display 11e on the display section 11, or the icon display, menu display, etc. on the monitor display 1id, and executes the retrieval processing of information to be requested by the user. The computer 20 executes also communication processing through the network 7 for retrieval as the need arises. Then the computer 20 causes the monitor display 11d to display the information as the retrieval result, actually retrieved information, and the like.

When the retrieval processing is ended, the computer 20 returns from step F141 to F134.

In the case where the user selects the download, the computer 20 proceeds from step F136 to F146, and first displays a download object selecting screen to urge the user to select.

FIGS. 20A and 20B show examples of the download object selecting screen.

For example, FIG. 20(a) shows a screen for urging selection of genres of information to be downloaded, and the options of genres are arranged. Here, if the user makes a touch operation to select 1: Newspaper, the computer 20 displays specific names of newspapers as shown in FIG. 20(b) to request selection. To this, for example, in the case where the user requests the download of the electronic newspaper issued by Tonan Newspaper Company, the computer selects 3: Tonan newspaper.

When such selection is completed, the computer 20 proceeds from step F147 to F148, and executes download of selected contents or the like. That is, the computer 20 loads the selected contents from the HDD 21 or the contents server 4a or the like through the network 7, and writes them in the disk 90.

By the download processing executed in this way, the user can get arbitrarily the selected information from the public terminal 1 by using the disk 90.

After ending the download processing, the computer 20 returns from step F149 to F134.

In the case where the user selects the edit, the computer 20 proceeds from step F138 to F142, and proceeds to the edit processing. That is, the computer 20 proceeds with the edit processing of the user in response to the touch operation of the user to the keyboard display 11e at the display section 11 or the icon display, menu display, or the like on the monitor display 11d. The computer 20 executes, for example, new preparation of a file such as a document, update of a data file read out of the disk 90, and so on, in response to the operation.

The computer 20 records the edited file to the disk 90 in response to the instruction of the user.

In this edit processing, the user makes such operations as editing on the basis of the data file stored in the disk 90, or new preparation of the data file, and at this time, the backup operation set at the above step F116 or F115 is executed.

Figure 21:
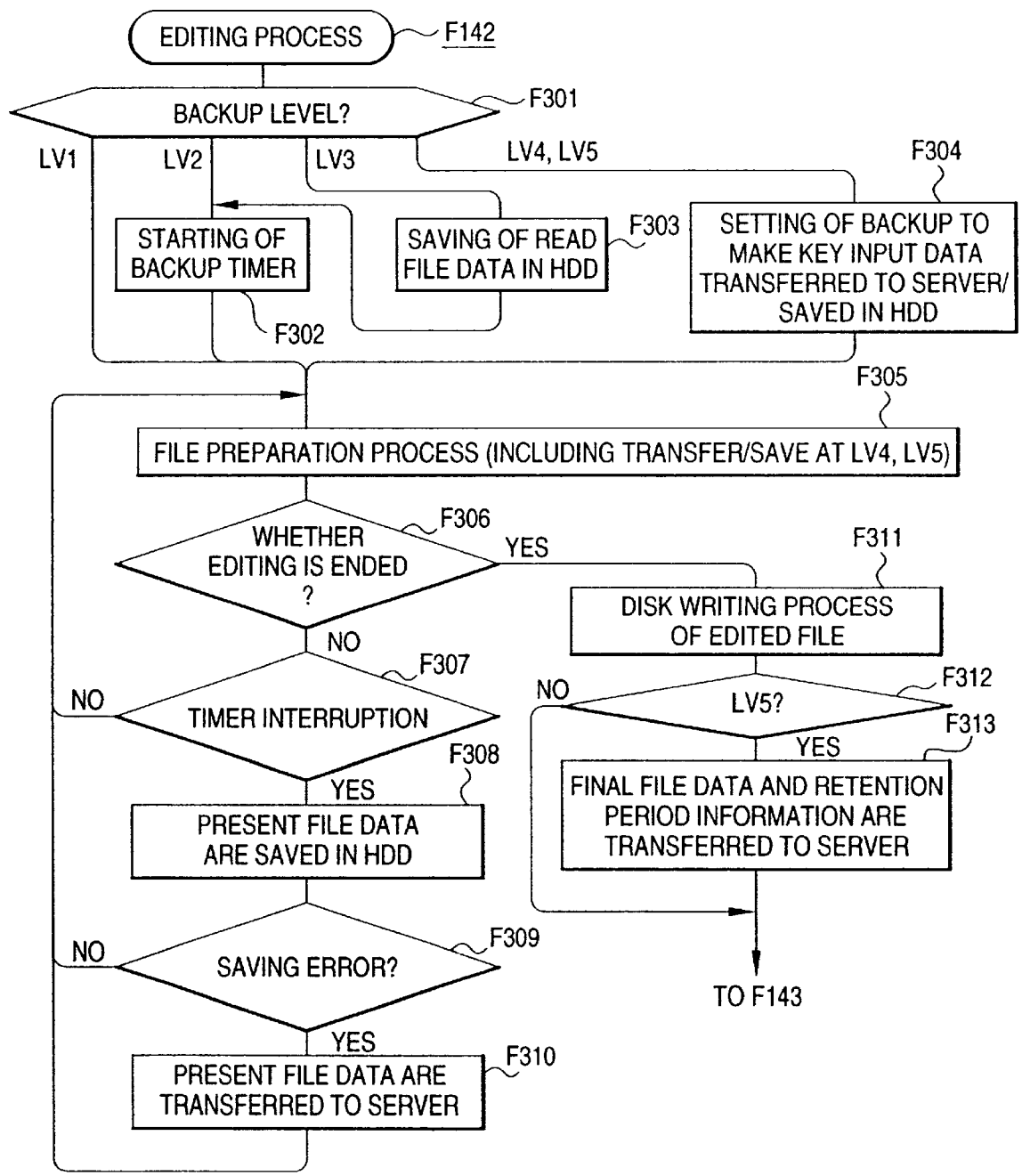
FIG. 21 is a flowchart of a processing of a public terminal of an embodiment.

The processing for this in step F142 is shown in detail as steps F301 to F313 in FIG. 21.

First, at the start of the edit processing, the computer 20 makes the processing branch off according to the set backup level at step F301.

When the backup level LV1 has been set, since the computer 20 does not execute the backup operation, the computer proceeds to step F204 directly.

When the backup level LV2 has been set, the computer 20 starts a backup timer for executing a periodic backup operation at step F302, and proceeds to step F305.

When the backup level LV3 has been set, the computer 20 first saves the data file read from the disk 90 into the HDD 21 at step F303, proceeds to step F302, starts the backup timer to execute the periodic backup operation, and proceeds to step F305. In the case where the data file is not read out at this point of time (for example, in the case where the user performs new preparation, and so on), since an object to be saved does not exist at step F303, the computer 20 proceeds to step F302 directly.

When the backup level LV4 or LV5 has been set, the computer 20 transmits all of key inputs to the server (public terminal management company 2) at step F304, and executes the operation setting to store them in the HDD 21. Then the computer 20 proceeds to step F305.

At step F305, the computer 20 executes the present file editing/preparation processing. That is, the computer 20 proceeds with editing/preparation of file data such as documents in response to the input of the user.

Further, at step F304, in the case where setting of the backup operation of the backup level LV4 or LV5 is made, the computer 20 saves all of the key input data into the HDD 21 at all times under the file edit processing at step F305, and further, transmits them to the backup section 2b of the public terminal management company 2 through the network 7. The backup section 2b stores the transmitted data for backup in response to the transmission.

In the case where the backup level LV3 is set, for example, when new file data are read out from the disk 90 under the file edit processing, the computer 20 saves the contents of the read file data for backup at that point of time into the HDD 21.

In the file preparation processing, only in the case where the backup timer is started at step F302 (that is, only in the case where the backup level LV2 or LV3 is set), interrupt processing occurs every predetermined time interval on the basis of the backup timer.

In that case, the computer proceeds from step F307 to F308, and executes the processing to save the file data under editing at that point of time into the HDD 21. Then the computer returns from step F309 to F305, and proceeds with the file edit processing.

Incidentally, similarly to the case described with reference to FIG. 16, in the case where a data writing error to the HDD 21 occurs by some cause, the computer 20 proceeds from step F309 to F310, transfers the file data to be saved to the public terminal management company 2, and has the data stored in the backup section 2b.

When the file edit processing is ended, the user makes an operation to save the file data in the disk 90. In that case, the computer 20 proceeds from step F306 to step F311, and records the file after completion of the edit in the disk 90 with a file name specified by the user.

Then the computer 20 proceeds to step F312, and in the case where the backup level LV5 is set, further proceeds to step F313, transmits the final file, that is, the file data recorded in the disk 90 to the public terminal management company 2, and has the data saved in the backup section 2*b*. At this time, the computer 20 simultaneously transmits the storage period information taken at step F116 or F115, and indicates the storage period at the backup section 2*b*.

The backup section 2*b* stores the final file only for the period specified by the storage period information. In this case as well, with respect to the key input information in the case of the backup level LV4 or LV5, the backup section 2*b* stores it only for a specific period.

When the above processing is ended, the computer 20 proceeds to step F143 in FIG. 19.

When judging that the edit processing is ended, the computer 20 returns to step F134.

In the case where the user selects the upload in the function selecting processing at step F134, the computer 20 proceeds from step F137 to F144, and proceeds to the upload processing. That is, in response to the touch operation of the user to the display section 11, the computer 20 executes the upload of a data file (data file recorded in the disk 90) specified by the user, a file such as a newly prepared or edited document, or the like. The destination of upload is the HDD 21 or a designated system or terminal through the network 7.

By this processing, it becomes possible for the user to upload the data written in the user's own disk 90 by using the public terminal 1 or the user's own personal computer, or the data prepared at that place, and to supply them to a specific person or unspecified many people, and so on. For example, the user can transmit an electronic mail or can provide music, videos, documents, and the like prepared by the user.

In this upload processing as well, in the case where there is a necessity, that is, in the case where the user performs preparation or editing of the data file, the backup operation set at step F116 or F115 is executed.

In the case where the contents previously recorded in the disk 90 are directly uploaded, it is not necessary to specifically make the backup operation.

Figure 22:
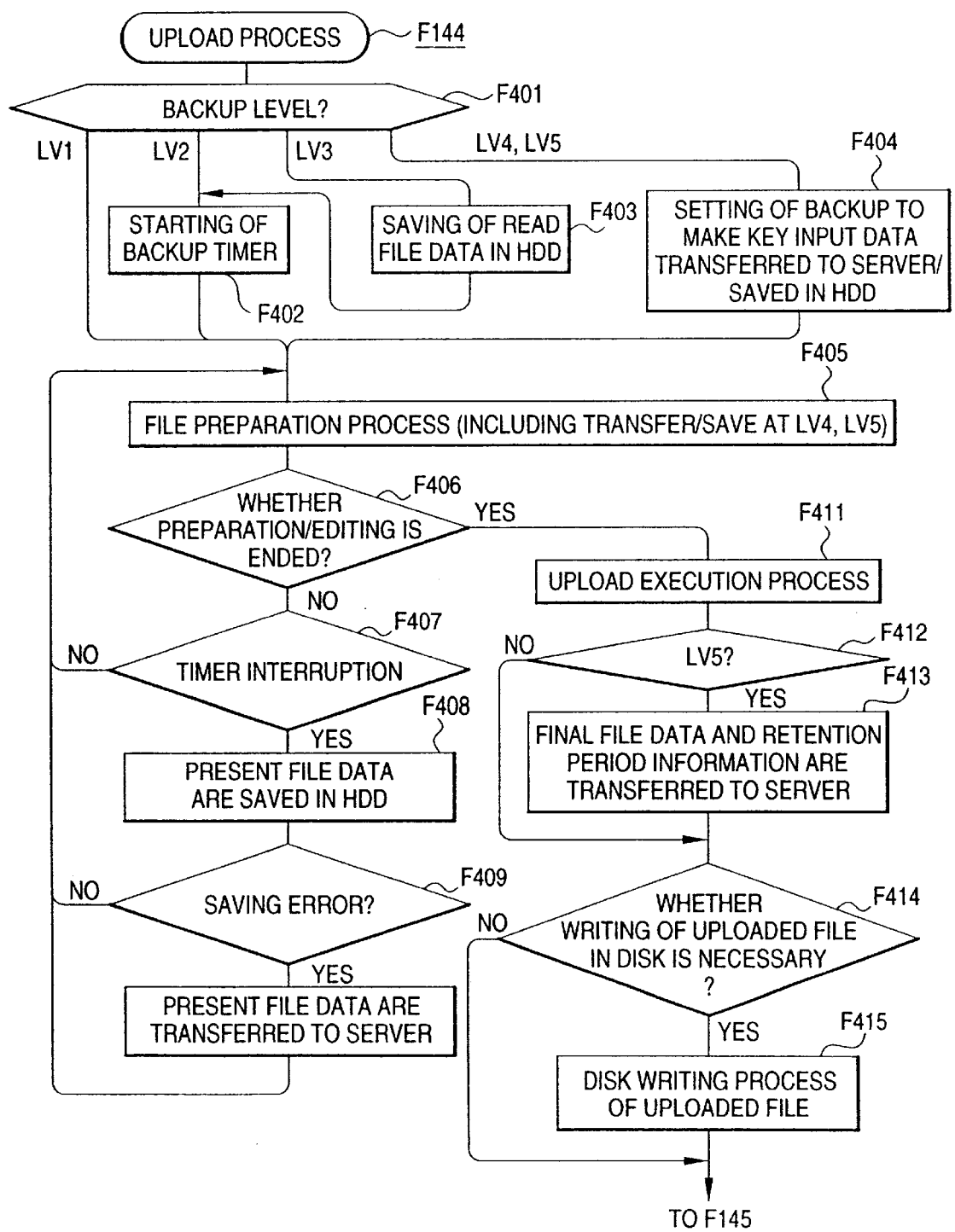
FIG. 22 is a flowchart of a processing of a public terminal of an embodiment.

The processing in the step F144 including the case where the backup operation is executed is shown in detail as steps F401 to F415 in FIG. 22.

At the start of the upload processing, the computer makes the processing branch off at step F401 according to the set backup level, executes a necessary processing among steps F402, F403, and F404 according to the setting, and proceeds to step F405. These become equal to steps F301 to F304 in FIG. 21.

At step F405, the computer 20 executes an present file editing/preparation processing. That is, the computer 20 proceeds with editing/preparation of file data such as documents in response to the input of the user.

However, in the case where the user uploads the data file read out from the disk 90 directly, the actual operation of file editing/preparation is not executed, and the user makes an upload instruction of the read data file. In that case, at step F405, substantial editing/preparation processing is not carried out, and the computer 20 proceeds from step F406 to F411. That is, in such a case, the backup operation in the editing/preparation processing is not executed.

In the case where some file editing/preparation is actually executed at step F405, and in the case where the backup operation setting of the backup level LV4 or LV5 is made at step F404, the computer 20 saves all of the key input data in the HDD 21 at all times under the file edit processing, and further, transmits them to the backup section 2*b* of the public terminal management company 2 through the network 7. The backup section 2*b* stores the transmitted data for backup in response to the transmission.

In the case of the backup level LV3, in addition to storing at step F403, in such a case that new file data are read from the disk 90 under the file edit processing, the computer saves the contents of the read file data at that point of time for backup into the HDD 21.

Under the processing of file preparation, only in the case where the backup timer is started at step F402 (only in the case where the backup level LV2 or LV3 is set), interrupt processing occurs every predetermined time interval on the basis of the backup timer.

In that case, similarly to the case of steps F307 to F310 of FIG. 16, the backup operation is executed every predetermined period in the processing of steps F407 to F410.

When the file preparation/editing processing is ended, the user performs the operation of upload of the file data. In that case, the computer 20 proceeds from step F406 to F411, and executes the upload processing of the file after completion of the preparation/editing to the address specified by the user.

Then the computer 20 proceeds to step F412, and in the case where the backup level LV5 is set, further proceeds to step F413, transmits the final file, that is, the uploaded file data to the public terminal management company 2, and has the data saved in the backup section 2*b*. At this time, the computer 20 simultaneously transmits also the storage period information taken at the foregoing step F116 or F115, and indicates the storage period at the backup section 2*b*.

In the backup section 2*b*, the final file is stored only for the period specified by the storage period information. In this case as well, with respect to the key input information in the case of the backup level LV4 or LV5, the backup section 2*b* stores it, for example, only for a specific period.

Subsequently, at step F414, the computer 20 judges whether the uploaded data file should be written in the disk 90.

If the data file read out from the disk 90 is uploaded without any edit, the computer 20 judges that writing is not necessary.

On the other hand, in the case where some edit is carried out or new preparation is made, the computer 20 inquires the user of whether it should be stored in the disk 90, and in the case where the user makes an instruction of storage execution, the computer proceeds to step F415 and records the uploaded data in the disk 90.

When the above processing is ended, the computer 20 proceeds to step F145 of FIG. 19.

When judging that the upload processing is ended, the computer 20 returns from step F145 to F134.

In the case where the use as the computer terminal is ended, the user selects the use end from the screen of the function selecting menu at step F134. In the case where the computer 20 detects the operation, the computer proceeds from step F135 to F150, and for the same purpose as the case of step F129 of FIG. 17, in the case where the computer executed the backup operation under the use, the computer deletes the backup data in the HDD 21.

Subsequently, at step F151, the computer 20 executes the accounting processing and the writing processing of use record into the disk 90.

As the accounting processing, the computer 20 causes the accounting processing by the coin processing section 30, the prepaid card processing section 31, or the credit card processing section 32 to be executed. Alternatively, in the case of payment of credit card registration, the computer 20 transmits the accounting information to the public terminal management company 2. Further, the computer 20 writes the fee record information (see FIG. 4) in the disk 90.

In this case as well, the fee charged to the user is determined according to the use time of the public terminal 1 and the processed content. In the case where download is executed, the purchase fee of the contents or the like is added.

Further, according to the backup level of the executed backup operation, a predetermined amount of money may be added as a backup service fee.

As the writing processing of the use record, the computer 20 writes a use time, information of a used file, application, contents, and the like, and information of a purchased application, contents, and the like, as the use record information, into the disk 90.

At step F152, the computer 20 executes the return processing of the disk 90, that is, drives the disk tray 14 to eject the disk 90, and causes the return processing of the card or change to be executed as the need arises.

Here, the computer 20 ends the operation as the computer terminal in the case where the disk 90 is used, and returns to step F101 of FIG. 18.

Although the processing of the public terminal 1 is executed as described above, this processing example is merely an example.

In the case where the public terminal 1 is a system which can be used without fee, it is needless to say that the fee insertion processing, accounting processing, and the like are not executed.

As is understood from the above processing example, in the case where backup is required at the use, that is, in the case where the user performs preparation and editing of a data file in the public terminal 1, since the backup operation is executed according to the set backup level, the safety of the data at the use is secured.

Besides, since the public terminal 1 displays the image for the telephone operation or the image for the information processing operation according to the use object of the user, that is, according to the use as the telephone or the use as the computer, it is satisfactory if the user makes operations in accordance with the displayed image, and the user can easily make operations for action of each function.

Besides, by providing the touch panel operation system on the display screen, it is unnecessary to dispose a number of operation keys and the like in the public terminal 1, so that simplification of the structure of the terminal unit can be realized, and it is also possible to make the operation of the user simple.

Particularly, that the push dial image or keyboard image for the touch panel operation is displayed can make the operation easy to understand for the user.

Besides, if the computer 20 judges that the telephone is to be used when the user picks up the receiver-transmitter 18, and that the computer terminal is to be used when the user loads the disk 90, it becomes unnecessary for the user to make even a selecting operation of a use object, so that simplicity is further increased.

Incidentally, as processing examples, further various examples are conceivable.

For example, although the initial screen is displayed when the public terminal is not used in the former example, it is conceivable that various displays are made when it is not used. Alternatively, it is conceivable that various image displays are made together with icons and the like for selection as the initial screen.

For example, when such pictures as to function as a screen saver, pictures for various advertisements, image pictures according to the set place, demonstration pictures, or the like are displayed, it is possible to make the system more interesting and having high additional value. According to circumstances, it is also possible to make the user's use fee free of charge by keeping advertisement pictures displayed.

With respect to the screen for the computer, although one in which the keyboard display 11e as shown in FIG. 15 is continuously displayed is basically satisfactory, it is also conceivable that at the timing when the input by the keyboard becomes unnecessary, the keyboard display 11e is made to disappear and the whole surface of the display section 11 is used as the monitor display 11d.

The keyboard display 11e may be enlarged or contracted to such a size that it is convenient for the user to use.

Further, as the keyboard image to be displayed, it is also possible to design such that the user can select various keyboard standards (JIS, new JIS, etc.) so that a keyboard which is easy for the user to use can be displayed.

In this embodiment, although the public terminal 1 can be used even if the disk 90 is not used, it is also possible to design such that the public terminal 1 can not be used if the disk 90 corresponding to the public terminal 1 is not loaded.

7. Modified Example

With respect to the backup operation which becomes the point of the present invention, various modified examples are conceivable. These will be described below.

First, although the backup ID is recorded in some disk 90 in the former example, when this backup ID is recorded in the rewritable area ARW as shown in FIG. 5, it is possible to enable the user to make rewriting, new setting, addition, and the like. That is, it becomes possible for the user to record a desired backup level as the backup ID, so that it is possible to make such that even if the backup level selecting operation is not executed at the use of the public terminal 1, the backup operation desired by the user is executed.

Besides, as in FIG. 6, for example, in the case where the backup ID is recorded correspondingly to each application, although not described as processing of the public terminal 1 in the foregoing example, when some application is started from the disk 90, it is satisfactory if the computer 20 automatically sets the backup level on the basis of the backup ID corresponding to the application.

Of course, in the case where a plurality of backup IDs are recorded for each application, data file, and the like, it is also conceivable that the user is made to be allowed to rewrite, newly set, or add the backup level ID.

Besides, in the foregoing example, in the case where the backup level ID is recorded in the disk 90, the backup level is automatically set on the basis of the backup ID. However, in that case as well, it is also acceptable to enable the user to select the backup level.

For example, such a system is conceivable that at the stage of step F116 in FIG. 18, display is made to express that the backup level corresponding to the backup ID is set, and if the user makes an operation of approval, automatic setting is directly made, and in the case where the user desires modification, transition to the processing of step F114 is made so that the backup level selecting screen is displayed.

The same applies to the storage period information in the case of the backup level LV5, and even if the storage period information is recorded in the disk 90, the user may perform such processing as to change the storage period at the use.

Of course, in the disk 90, such a case is also conceivable that although the backup ID indicating the backup level LV5 is recorded, the storage period information is not recorded. In that case, it is satisfactory if such display as in FIG. 14B is made to request the user to set the storage period.

Further, it is also acceptable to enable the user to specify the period of storage of key input data executed at the backup level LV4 or LV5. On the contrary, it is also conceivable that the storage period of the final file at the backup level LV5 is made a fixed period so that the user is made to be unable to specify it.

Besides, as described in FIG. 1, although the public terminal 1 in the foregoing example is made one which can communicate with the public terminal management company 2 through the network, the public terminal 1 which is not connected to the network is also conceivable. In the backup operation in that case, it is satisfactory if only the inside HDD 21, for example, is made the destination of backup. It is sufficient if one of the backup levels LV1 to LV3, for example, can be selected.

Besides, in the foregoing example, the backup data in the HDD 21 are deleted at the end of the use of the public terminal 1. However, it is also possible to consider such a processing example that deletion is not carried out, and further, such a processing example that the user is inquired whether deletion should be done, and if an instruction of deletion is made, the deletion is executed.

Besides, in the foregoing example, as the backup operation systems, the backup levels LV1 to LV5 are cited as examples. However, of course, the number of backup operation systems to be selected, the operation content of each backup operation system, and the like are variously conceivable.

Further, such a processing example is also conceivable that the backup operation system to be executed is made one kind, and the user only selects whether or not the backup is executed, or that the backup operation is executed irrespective of the user's intention.

Although modified examples of the present invention have been described, modified examples of the processing and structure are further variously conceivable.

Particularly, backup operation timing, data as an object of backup, a storage medium as a destination of backup, and the like may be suitably set according to actual system specifications or setting, a management system, and the like.

As is understood from the above description, the present invention has the following advantages.

According to the present invention, when a computer terminal is used, data under an information processing operation or just before or after the operation are backed up in one of or both of a terminal side data storage section and a server side data storage section with a predetermined backup operation system. Thus, even when the computer terminal is hanged, it is possible to prevent loss of the data under the operation such as edit or just before or after the operation. In the case where the data are backed up in the server side data storage section, even if there occurs trouble of the computer terminal, crash of the terminal side data storage section, or the like, it is possible to prevent the loss of the data.

Further, if the data before the operation is saved for backup, for example, even if there is a mistake of saving operation by the user, a necessary file can be revived. For example, when some file data are read out, are edited, and are saved as a new file in a recording medium, even if the original file data have been deleted by overwriting since the new file has been saved with the same file name as the original file, the original (prior to the operation) file data can be revived since the data are backed up.

Besides, if the data after the operation are backed up in the server system, the file after the operation (that is, a new file prepared by editing or new preparation) can be accessed at an arbitrary time and an arbitrary place (any terminal unit capable of communicating with the server system, such as an arbitrary computer terminal), so that the convenience is extremely improved.

Besides, according to the invention, since a backup operation system, that is, timing of a backup operation, an object to be backed up, a destination of backup, and the like are set based on identification information recorded in a removable recording medium. Thus, it is not necessary for the user to bother to select the backup operation system at the use, and also a selection mistake does not occur by that. Thus, with respect to information processing using a file or application recorded in the recording medium, backup in the optimum backup operation system is always executed.

Moreover, according to the invention, the identification information recorded in the recording medium is made information to select a specific backup operation system among a plurality of backup operation systems (for example, a plurality of backup systems which the computer terminal can execute). Thus, it is possible to realize simplification of the code system or the like as the identification information, simplification of setting processing of the backup control section, and so on.

Moreover, according to the invention, since plural pieces of identification information are recorded in the recording medium, for example, each identification information can also be made identification information individually corresponding to each application or data file recorded in the recording medium. Thus, it is also possible to set the optimum backup operation system according to each application or data file.

Moreover, according to the invention, since the backup operation system is set according to an instruction of the user through the input section, a backup operation desired by the user himself can be realized according to working to be executed by the user or the importance of file content.

That the selection of the backup operation system on the basis of input through the input section is possible means that for example, even if identification information to specify the backup system is recorded in the recording medium as in the above, a different backup operation system can be specified according to a request of the user.

Moreover, according to the invention, the user merely makes input of selecting a specific backup operation system through the input section among a plurality of backup operation systems, and the specifying operation of the backup operation system can be made simple.

Moreover, according to the invention, when the backup data are saved in the server side data storage section, the storage period can be specified. Thus, for example, during the period set according to the identification information recorded in the recording medium or the input of the user, files and the like can be backed up. For example, the storage period can be set according to the content of the file or the circumstances of the user.

Moreover, according to the invention, when the use of the computer terminal is ended, the data backed up in the terminal side data storage section by the inside backup section are deleted. Thus, the data file and the like edited/prepared by the user do not remain in the computer terminal after the use of the computer terminal, which can avoid danger (that is, a leak of personal information) due to the state that the personal file or the like of the user is kept remaining in the so-called public unit. Thus, security of user information at the use of the system can be improved. Moreover, according to the invention, it is possible to design such that a sum of money corresponding to the backup operation system is charged to the user. That is, the charge collection corresponding to the capacity of the executed backup operation (that is, corresponding to the service level) becomes possible. For the user, such use becomes possible that in view of the content of the backup service and the fee, a desired backup operation is selected.

What is claimed is:

1. A computer system comprising a server and a computer terminal, the server and the computer terminal being connected for communication with each other, wherein the computer terminal comprises:
- a data processor for processing a data file;
- input means for selecting one of a plurality of external backup operations;
- a storage period specifying part for specifying a storage period of backup data for at least one predetermined one of the selected external backup operations;
- a communication part for communicating with the server; and
- a controller for executing the selected external backup operation to cause the communication part to transmit the data file processed by the data processor as the backup data and storage period information indicating the storage period specified by the storage period specifying part to the server; and wherein the server comprises:
- a receiver for receiving the data file as the backup data transmitted from the communication part; and
- a storage unit for storing the data file received by the receiver.

2. A computer system according to claim 1, wherein the server further comprises a storage period control part for controlling the storage unit so that the backup data are saved in the storage unit during the storage period indicated by the storage period information received by the receiver.

3. A computer terminal connected to a server for communication, comprising:
- a data processor for processing a data file;
- input means for selecting one of a plurality of external backup operations;
- a storage period specifying part for specifying a storage period of backup data for at least one predetermined one of the selected external backup operations;
- a communication part for communicating with the server; and
- a controller for executing the selected external backup operation to cause the communication part to transmit the data file processed by the data processor as the backup data and storage period information indicating the storage period specified by the storage period specifying part to the server.

* * * * *